US009489547B2

(12) United States Patent
Watanabe et al.

(10) Patent No.: US 9,489,547 B2
(45) Date of Patent: Nov. 8, 2016

(54) CARD READER

(71) Applicant: NIDEC SANKYO CORPORATION, Suwa-gun, Nagano (JP)

(72) Inventors: Takeki Watanabe, Nagano (JP); Hiroshige Takeda, Nagano (JP); Toshio Tatai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/892,449

(22) PCT Filed: Apr. 3, 2014

(86) PCT No.: PCT/JP2014/059833
§ 371 (c)(1),
(2) Date: Nov. 19, 2015

(87) PCT Pub. No.: WO2015/064124
PCT Pub. Date: May 7, 2015

(65) Prior Publication Data
US 2016/0232384 A1    Aug. 11, 2016

(30) Foreign Application Priority Data

Oct. 29, 2013   (JP) ................... 2013-224484
Oct. 29, 2013   (JP) ................... 2013-224485

(51) Int. Cl.
*G06K 7/00*   (2006.01)
*G06K 7/08*   (2006.01)
*G06K 13/18*  (2006.01)

(52) U.S. Cl.
CPC ........... *G06K 7/0069* (2013.01); *G06K 7/0013* (2013.01); *G06K 7/084* (2013.01); *G06K 13/18* (2013.01)

(58) Field of Classification Search
CPC .. G06K 7/0069; G06K 7/084; G06K 7/0013; G06K 13/08
See application file for complete search history.

(56) References Cited

U.S. PATENT DOCUMENTS 4,197,988 A * 4/1980 Moss ............... G06K 7/084
                                                235/381
5,196,687 A * 3/1993 Sugino ............. G06K 7/0021
                                                235/441

(Continued)

FOREIGN PATENT DOCUMENTS

| JP | 2005056376 A | 3/2005 |
| JP | 2006155567 A | 6/2006 |
| JP | 2012203521 A | 10/2012 |

OTHER PUBLICATIONS

International Search Report corresponding to Application No. PCT/JP2014/059833; Date of Mailing: Jun. 17, 2014, with English translation.

Primary Examiner — Kristy A Haupt
(74) Attorney, Agent, or Firm — Cantor Colburn LLP

(57) ABSTRACT

A card reader may include a card insertion port; a card conveying passage; and a card lock mechanism. The card lock mechanism may include a motor; a rotation shaft; a gear provided with a power transmission gear part and a ratchet gear part; a clutch mechanism disposed between the rotation shaft and the gear; a ratchet member to engage with the ratchet gear part; a cam member held by the rotation shaft; a torque limiter which is disposed between the rotation shaft and the cam member; an urging member which urges the ratchet member in a direction where the cam follower is contacted with the cam face; a stopper for restricting a turnable range of the cam member; and a lock member.

15 Claims, 17 Drawing Sheets

(56) References Cited

U.S. PATENT DOCUMENTS 7,364,076 B2* 4/2008 Oguchi .................. G06K 13/08
235/380
8,210,438 B2* 7/2012 Orii ...................... G06K 7/0021
235/380
2005/0150954 A1* 7/2005 Oguchi ................ G06K 7/0013
235/439
2015/0287289 A1* 10/2015 Lewis ................... G07F 19/201
235/379

* cited by examiner

Fig. 5
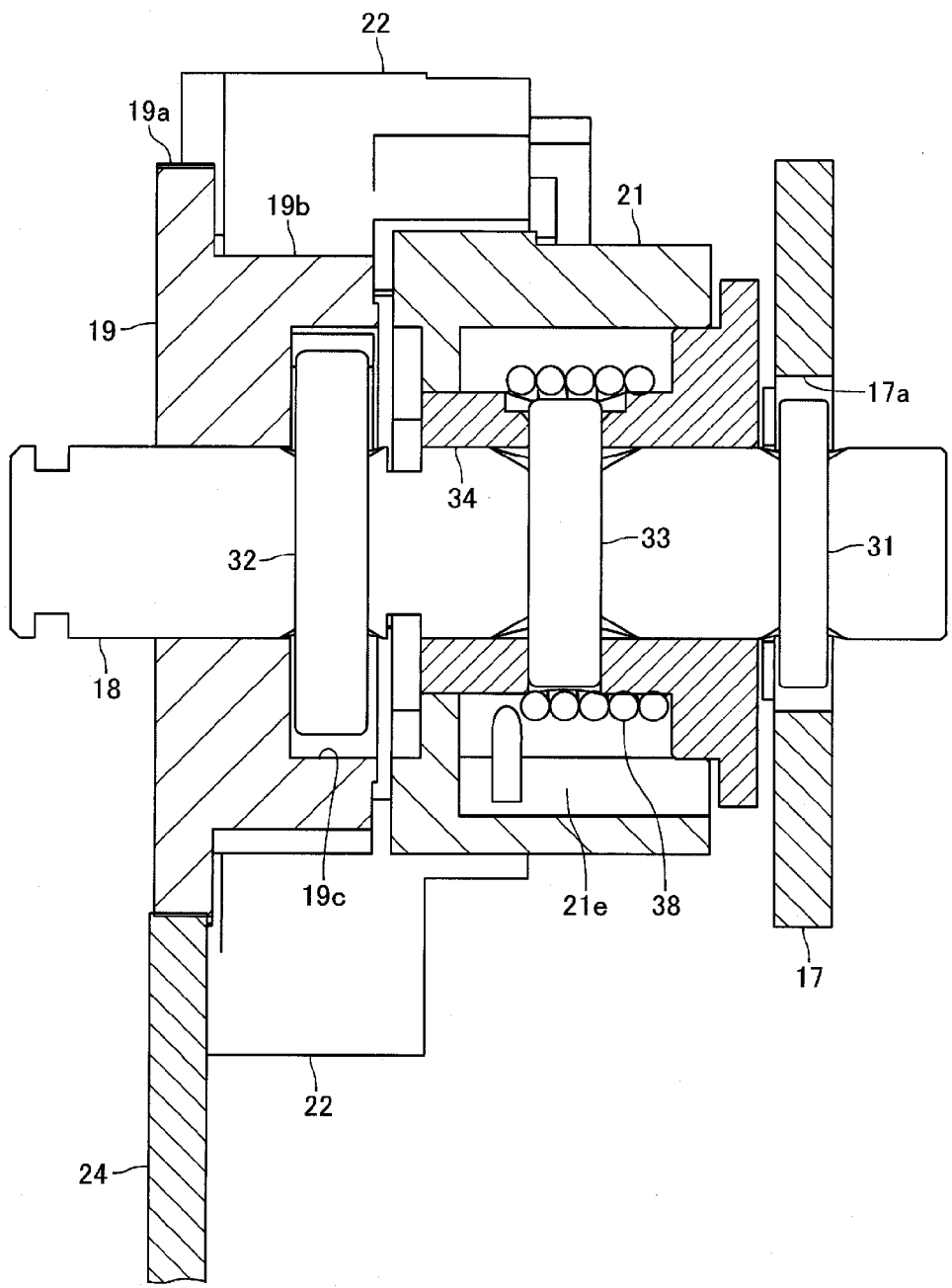
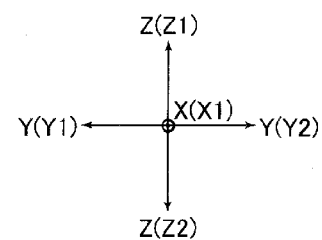

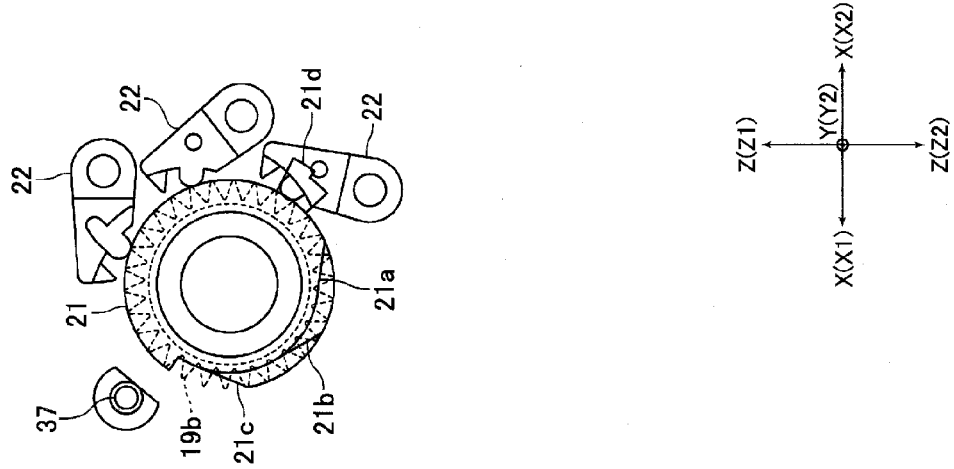
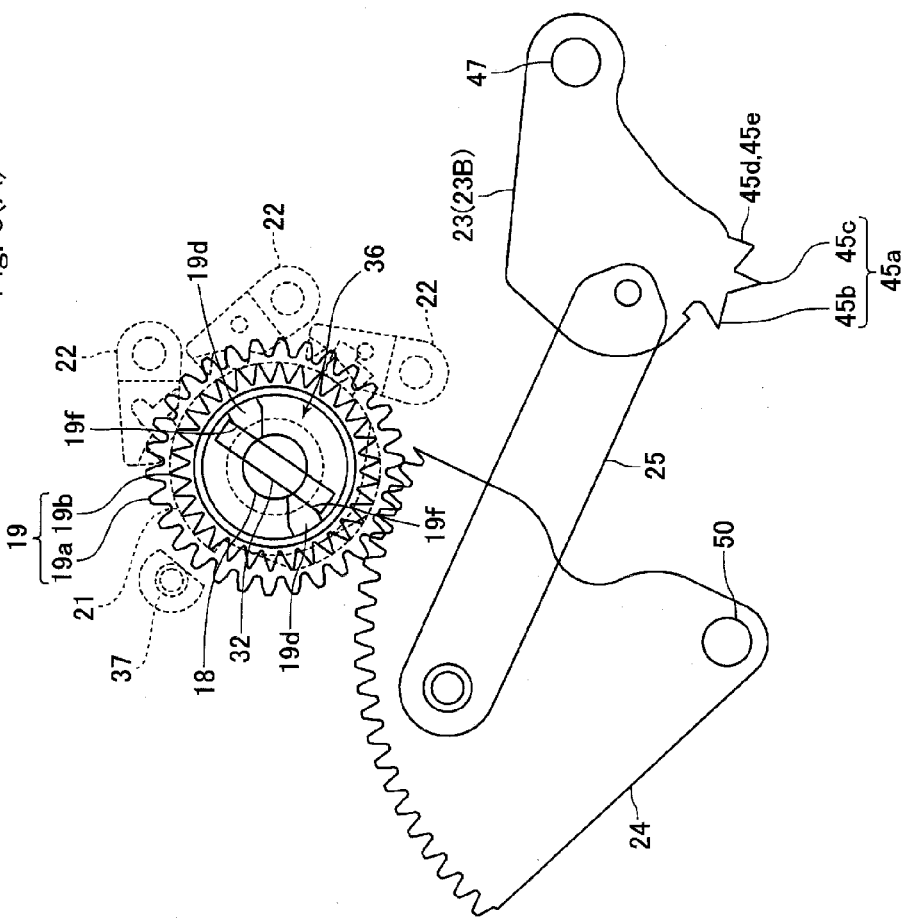

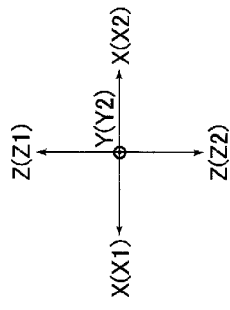
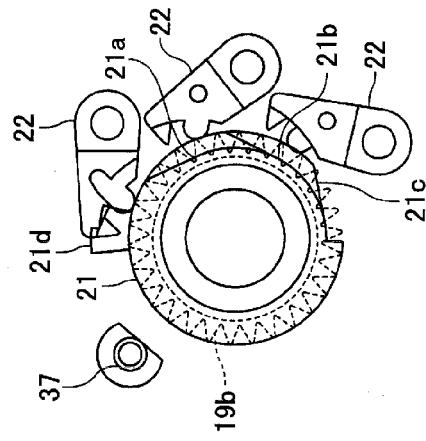
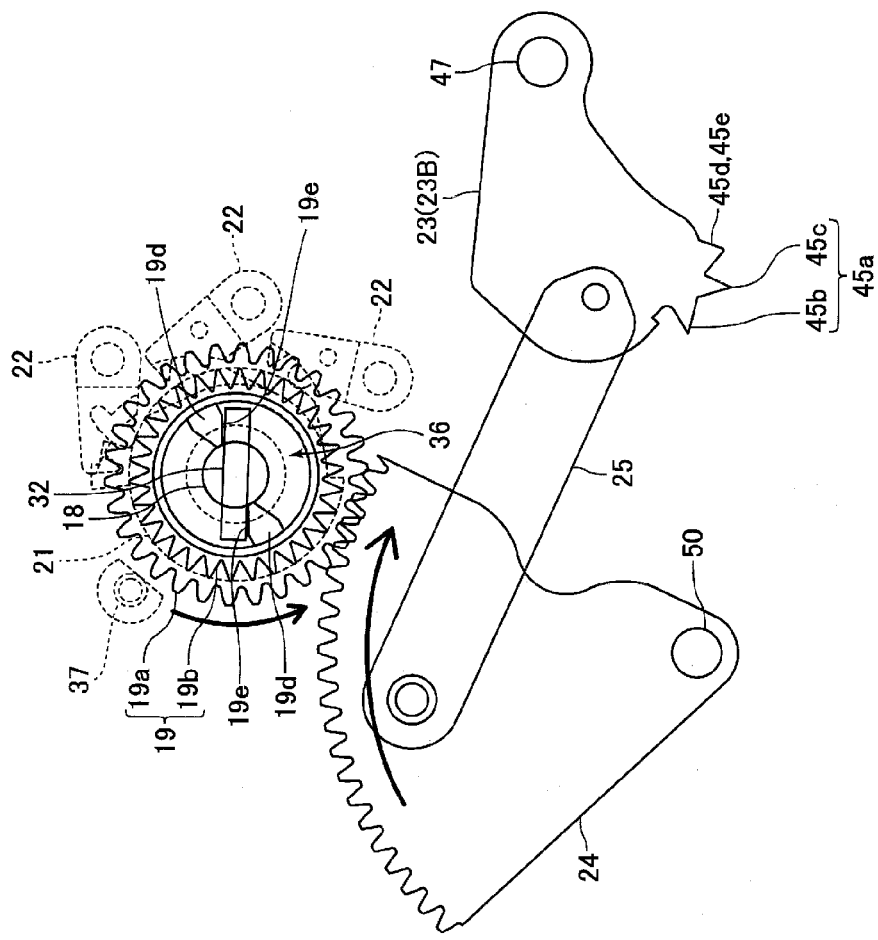
Fig. 10(B)
Fig. 10(A)

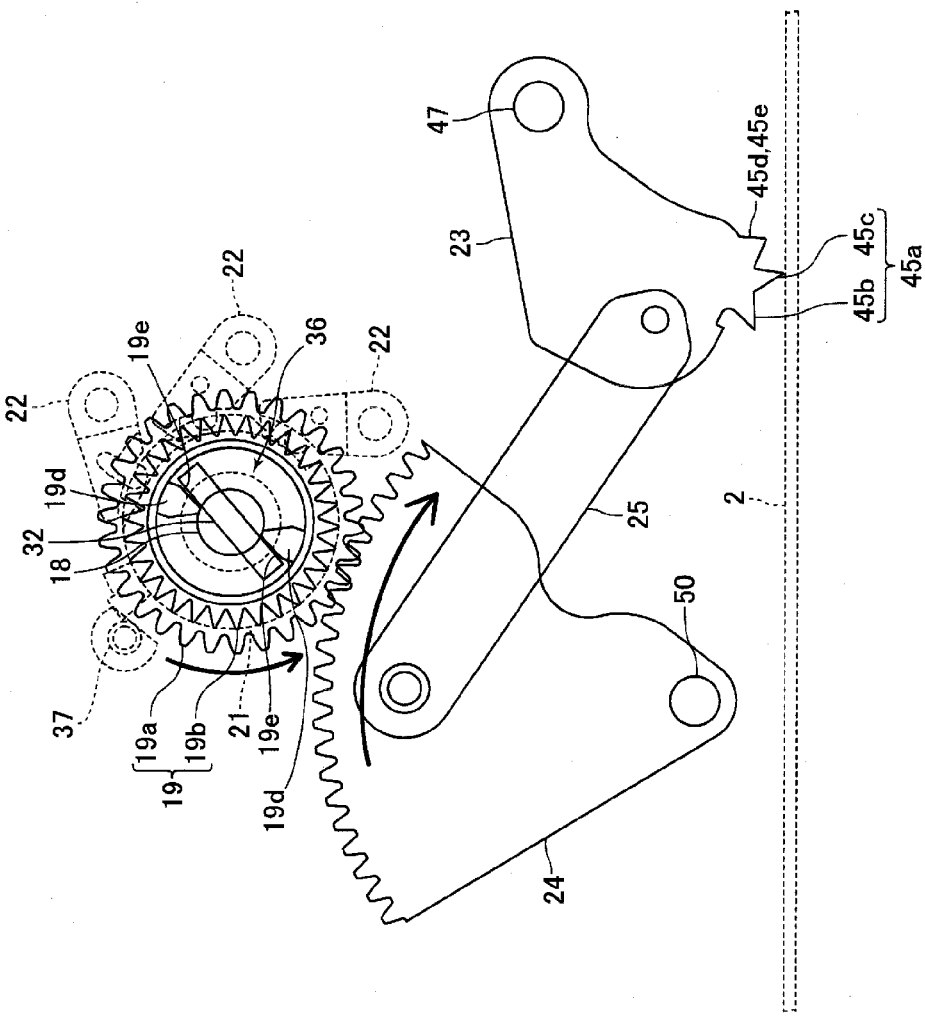

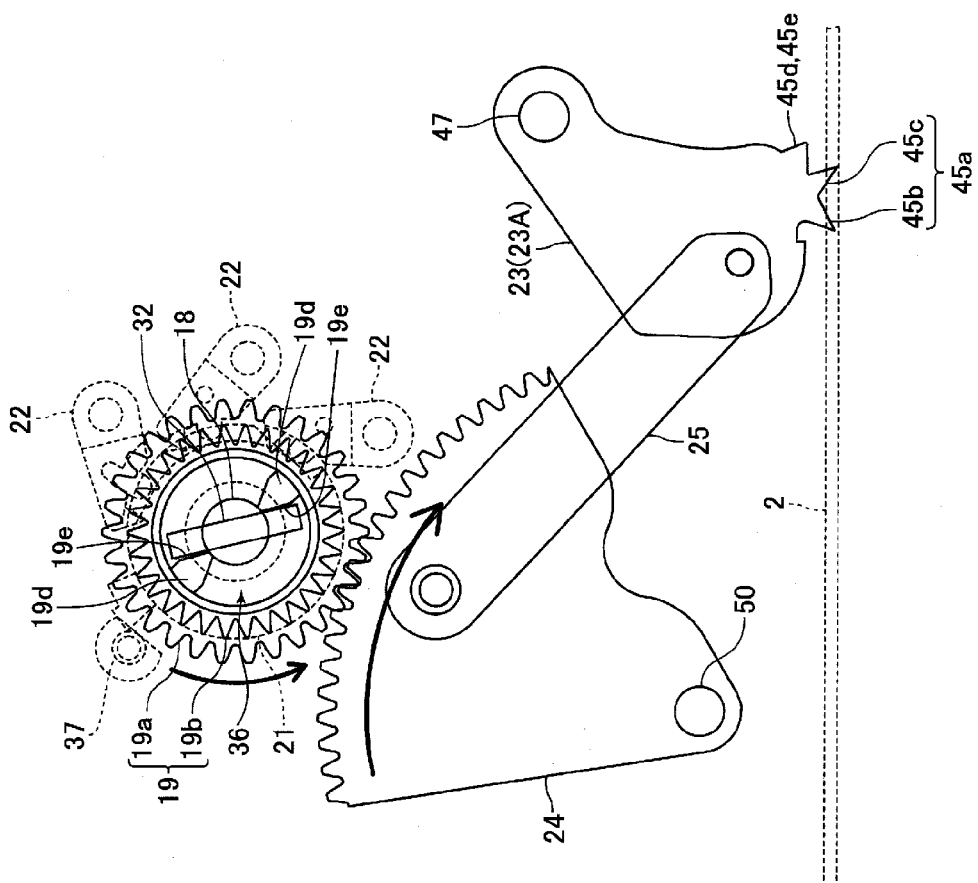
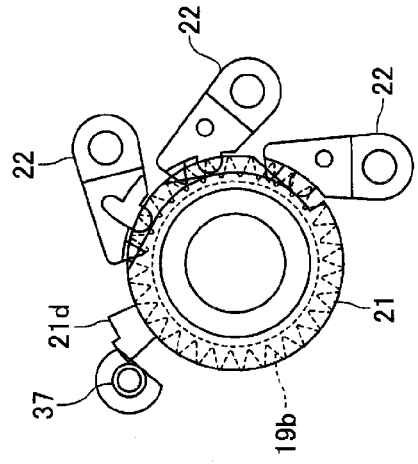
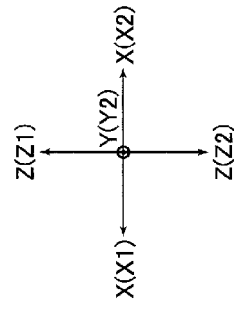
Fig. 13(A)
Fig. 13(B)

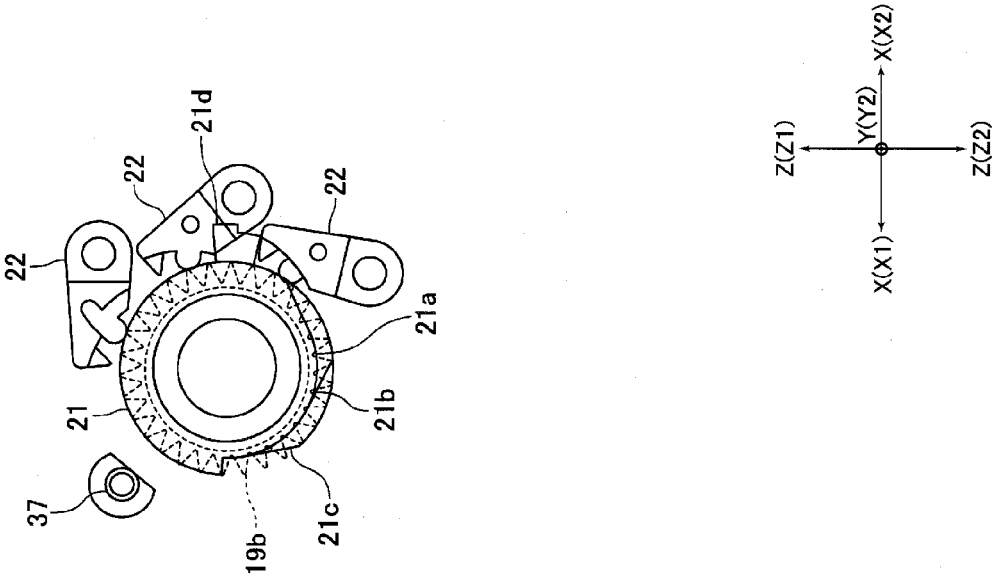
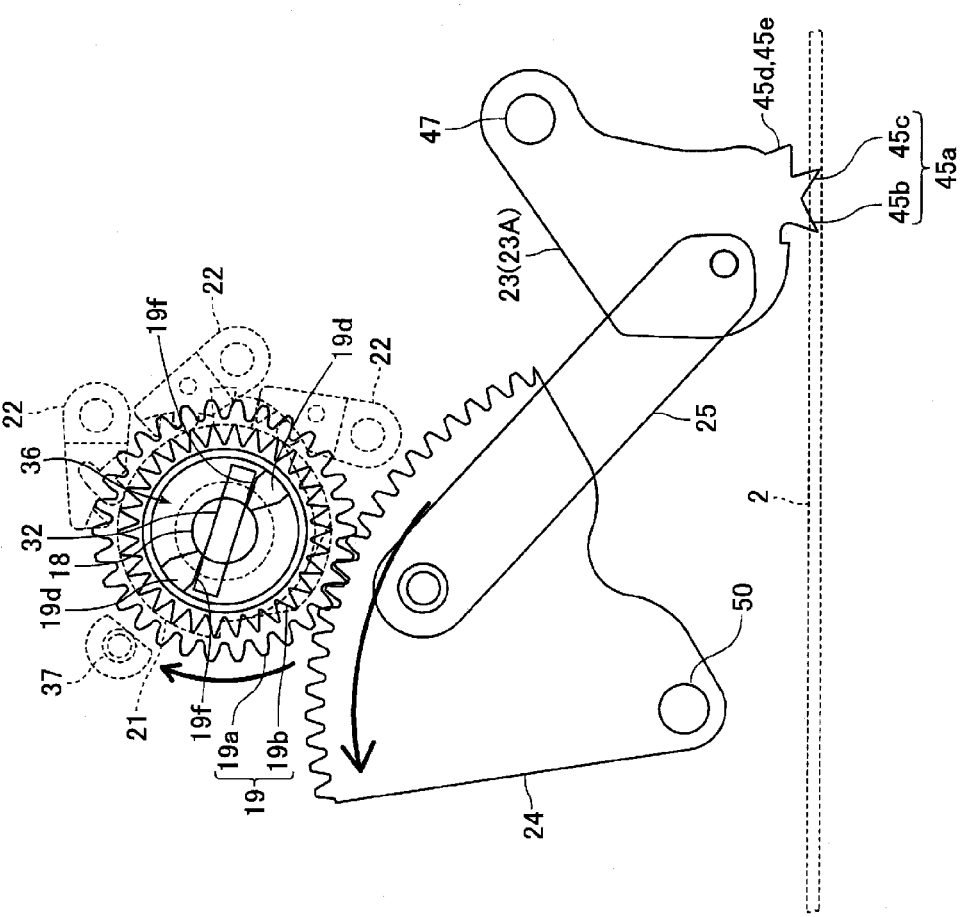

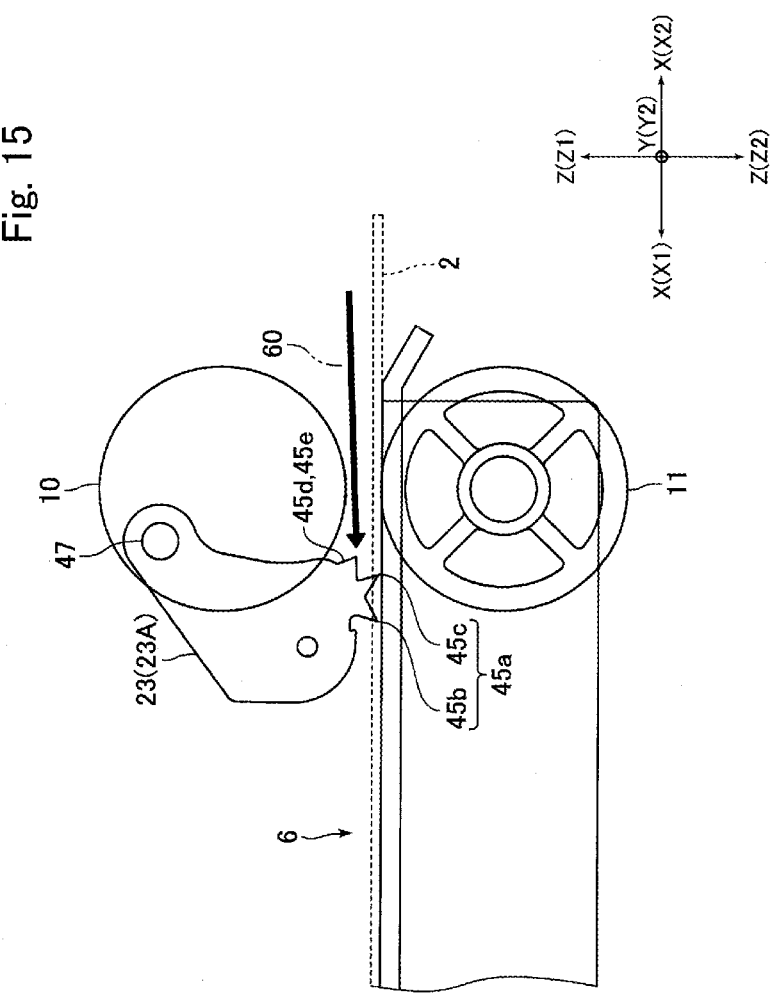

Fig. 17
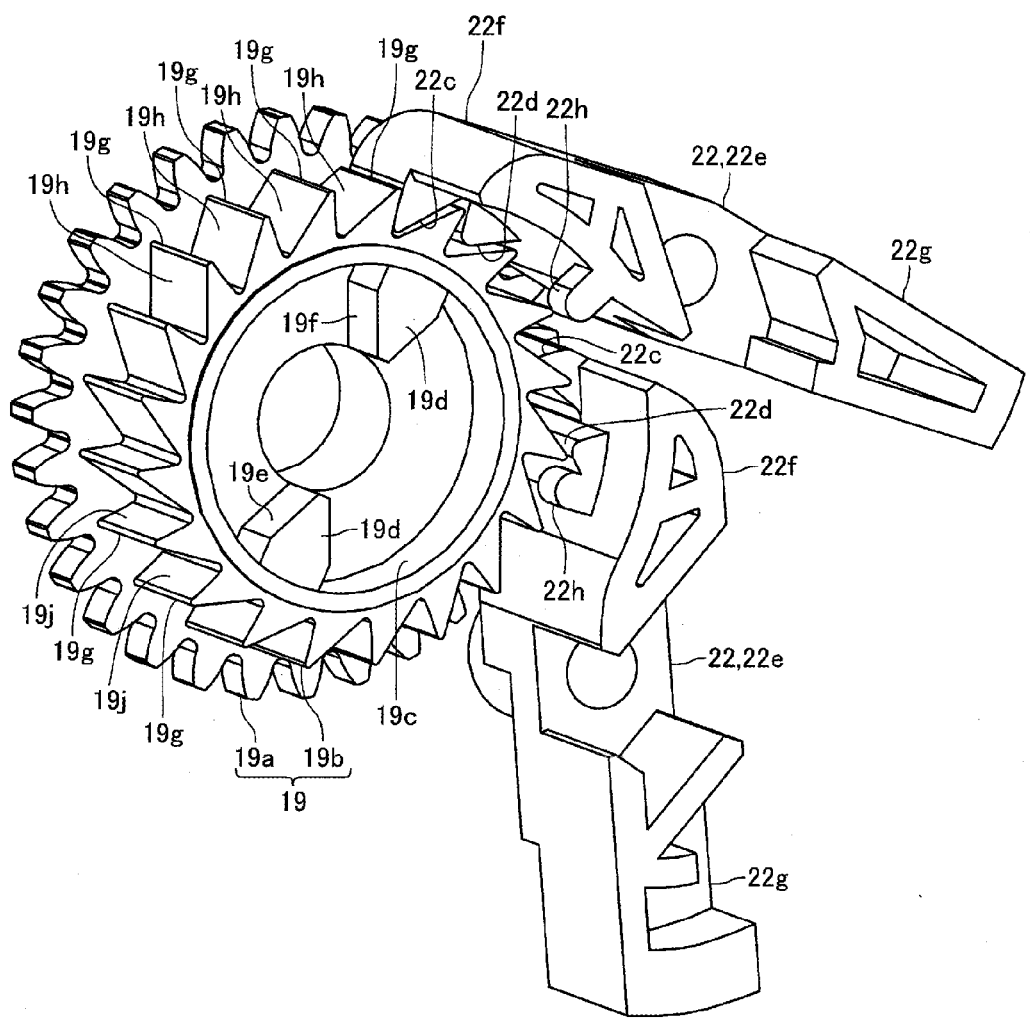
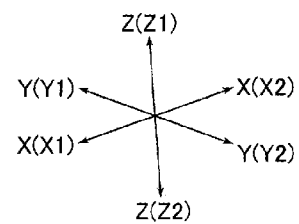

Fig. 18
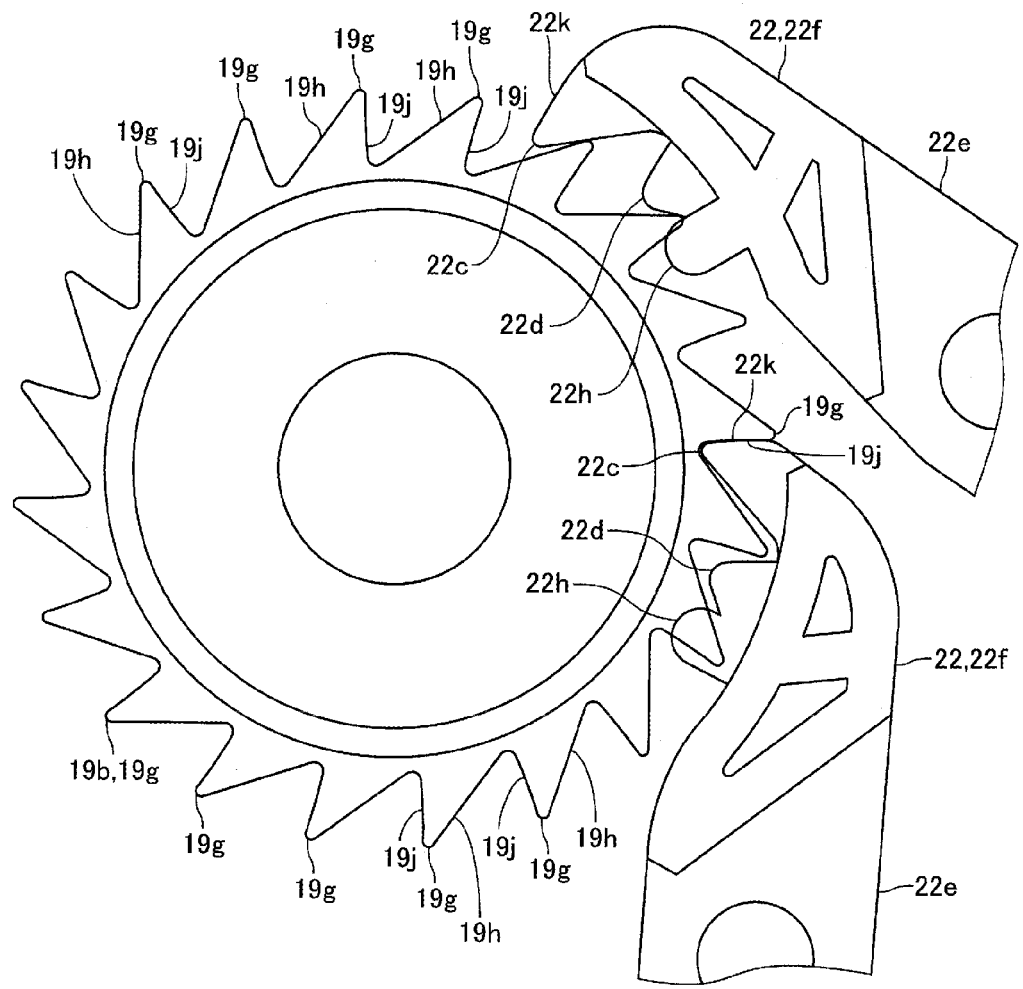
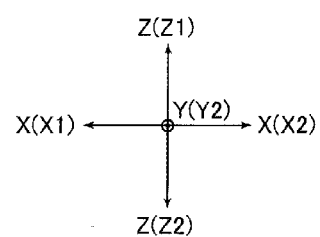

CARD READER

CROSS REFERENCE TO RELATED APPLICATIONS

This is the U.S. national stage of application No. PCT/JP2014/059833, filed on Apr. 3, 2014. Priority under 35 U.S.C. §119(a) and 35 U.S.C. §365(B) is claimed from Japanese Applications Nos. 2013-224484, filed Oct. 29, 2013; and 2013-224485, filed Oct. 29, 2013; the disclosures of which are incorporated herein by reference.

FIELD OF THE INVENTION

At least an embodiment of the present invention relates to a card reader which performs reading data recorded in a card and recording data in a card.

BACKGROUND

Conventionally, a card reader has been widely utilized which performs reading data recorded in a card and recording data in a card. In an industry such as a financial institution where a card reader is utilized, so-called phishing, i.e., a criminal intentionally clogs a card in an inside of a card reader and acquires the card illegally, is a large issue. Therefore, conventionally, a card reader having a card lock mechanism for preventing the phishing has been proposed (see, for example, Patent Literature 1).

In the card reader described in Patent Literature 1, the card lock mechanism includes a lock lever for preventing drawing of a card from a card insertion port. The lock lever is provided with lock teeth in a substantially triangular shape which is structured to contact with a card and prevent drawing of the card. The lock lever is turnably supported by a support pin. Further, the lock lever is connected with a motor through a connecting lever, a fan-shaped gear and a gear train. The lock lever is turnable between a position where the lock teeth are retreated from a card conveying passage and a position where the lock teeth are contacted with the card by power of the motor.

In the card reader described in Patent Literature 1, when a card is abnormally stopped and the card is clogged in the card conveying passage, the card lock mechanism is operated and the lock teeth retreated from the card conveying passage are contacted with the card. In a state that the lock teeth are contacted with a card, the lock teeth are inclined to a rear side of the card reader toward the card. Therefore, when a card is to be drawn from the card insertion port, the lock teeth stick into the card and thereby drawing of the card from the card insertion port is prevented.

PATENT LITERATURE

[PTL 1] Japanese Patent Laid-Open No. 2006-155567

Criminal acts by a criminal have been sophisticated year by year and thus, even in the card reader described in Patent Literature 1, we have found that phishing may be performed by a criminal. Specifically, a criminal act (phishing) may be performed so that a criminal disables the function of the lock lever and the lock teeth in a state that the lock teeth are contacted with a card by a foreign matter inserted from a card insertion port side and then the card is drawn from the card insertion port.

SUMMARY

In view of the problem described above, at least an embodiment of the present invention provides a card reader which is capable of surely preventing the phishing with a relatively simple structure.

To achieve the above, at least an embodiment of the present invention provides a card reader including a card insertion port into which a card is inserted and from which the card is ejected, a card conveying passage where the card inserted from the card insertion port is conveyed, and a card lock mechanism structured to prevent drawing of the card from the card insertion port when the card is abnormally stopped in the card conveying passage and the card is clogged in the card conveying passage. The card lock mechanism includes a motor, a rotation shaft which is rotated by power of the motor, a gear which is relatively turnably held by the rotation shaft and is provided with a power transmission gear part for power transmission and a ratchet gear part integrally turning with the power transmission gear part, a clutch mechanism which is disposed between the rotation shaft and the gear in a transmission direction of the power of the motor, a ratchet member structured to engage with the ratchet gear part to prevent turning of the gear, a cam member which is relatively turnably held by the rotation shaft and is formed with a cam face with which a cam follower formed on the ratchet member is contacted for moving the ratchet member between a position where the ratchet gear part and the ratchet member are engaged with each other and a position where an engaging state of the ratchet gear part with the ratchet member is released, a torque limiter which is disposed between the rotation shaft and the cam member in the transmission direction of the power of the motor, an urging member which urges the ratchet member in a direction where the cam follower is contacted with the cam face, a stopper for restricting a turnable range of the cam member, and a lock member which is formed with a prevention part structured to contact with the card for preventing drawing of the card and is movable by power transmitted from the power transmission gear part between a contact position where the prevention part is contacted with the card and a retreated position where the prevention part is retreated from the card conveying passage. In a case that a turning direction of the rotation shaft, the gear and the cam member when the lock member is moved from the retreated position toward the contact position is a first turning direction, and a turning direction of the rotation shaft, the gear and the cam member when and the lock member is moved from the contact position toward the retreated position is a second turning direction, when the cam member is turned in the first turning direction from a state that the lock member is located at the retreated position, the cam member is contacted with the stopper to restrict the turnable range of the cam member, when the rotation shaft is turned in the first turning direction by the power of the motor from the state that the lock member is located at the retreated position, the torque limiter transmits power of the rotation shaft to the cam member until the cam member is contacted with the stopper and, when the cam member is contacted with the stopper, the torque limiter cuts off transmission of the power of the rotation shaft to the cam member and, when the rotation shaft is turned in the second turning direction by the power of the motor from the state that the lock member is located at the contact position, the torque limiter transmits the power of the rotation shaft to the cam member. The clutch mechanism is a pin clutch including a pin, which is fixed to or formed on one of the rotation shaft and the gear with a radial direction of the rotation shaft and the gear as an axial direction, and an engaging projection which is fixed to or formed on the other of the rotation shaft and the gear so that the pin is capable of engaging with both ends of the engaging projection in a circumferential direction of the rotation shaft and the gear. The clutch mechanism is operated so that, when the rotation shaft is turned in the first turning direction by the power of the motor and the pin is abutted with one end of the engaging projection in the circumferential direction, the power of the rotation shaft turning in the first turning direction is transmitted to the gear and, when the rotation shaft is turned in the second turning direction by the power of the motor and the pin is abutted with the other end of the engaging projection in the circumferential direction, the power of the rotation shaft turning in the second turning direction is transmitted to the gear and, when the rotation shaft is turned by the power of the motor so that the pin is moved between the one end of the engaging projection and the other end of the engaging projection in the circumferential direction, transmission of the power of the rotation shaft to the gear is cut off and thereby, when the ratchet gear part and the ratchet member are engaged with each other, turning of the gear in the second turning direction is prevented and movement of the lock member from the contact position toward the retreated position is prevented. When the lock member is located at the retreated position, an engaging state of the ratchet gear part with the ratchet member is released and, when the lock member is located at the contact position, the ratchet gear part and the ratchet member are engaged with each other and, when the rotation shaft is turned in the first turning direction from a state that the lock member is located at the retreated position and the cam member is contacted with the stopper and thereby the cam member is stopped, the ratchet gear part and the ratchet member are engaged with each other and, when the rotation shaft is turned in the second turning direction from a state that the lock member is located at the contact position, the engaging state of the ratchet gear part with the ratchet member is released before the pin abutted with the one end of the engaging projection in the circumferential direction is moved and abutted with the other end of the engaging projection in the circumferential direction and the gear begins to turn in the second turning direction.

In the card reader in accordance with at least an embodiment of the present invention, when the prevention part of the lock member for preventing drawing of a card is located at the contact position where the prevention part is contacted with the card, the ratchet gear part and the ratchet member are engaged with each other and thus turning of the gear in a direction where the lock member is moved from the contact position to the retreated position (second turning direction) is prevented and movement of the lock member from the contact position toward the retreated position is prevented. Therefore, according to at least an embodiment of the present invention, even when a criminal inserts a foreign matter from the card insertion port for trying to move the lock member in a direction from the contact position to the retreated position in a contacted state of the prevention part with a card, the prevention part is prevented from being moved to a state that engagement of the ratchet gear part with the ratchet member is released. Accordingly, in at least an embodiment of the present invention, even when a criminal tries to draw a card with which the prevention part is contacted from the card insertion port, the card is prevented from being drawn out from the card insertion port by an operation of the prevention part. As a result, according to at least an embodiment of the present invention, the phishing can be prevented surely.

Further, in the card reader in accordance with at least an embodiment of the present invention, when the rotation shaft is turned in the first turning direction from a state that the lock member is located at the retreated position, the torque limiter disposed between the rotation shaft and the cam member in a transmitting direction of power of the motor transmits power of the rotation shaft to the cam member until the cam member is contacted with the stopper and, when the cam member is contacted with the stopper, the torque limiter cuts off transmission of the power of the rotation shaft to the cam member and, when the rotation shaft is turned in the second turning direction from a state that the lock member is located at the contact position, the torque limiter transmits the power of the rotation shaft to the cam member. Further, in at least an embodiment of the present invention, after the rotation shaft is turned in the first turning direction from the state that the lock member is located at the retreated position and, when the cam member is contacted with the stopper and the cam member is stopped, the ratchet gear part and the ratchet member are engaged with each other. In addition, according to at least an embodiment of the present invention, the clutch mechanism disposed between the rotation shaft and the gear in the transmitting direction of power of the motor is operated so that, when the rotation shaft is turned in the first turning direction and the pin is abutted with one end of the engaging projection in the circumferential direction, the power of the rotation shaft turning in the first turning direction is transmitted to the gear and, when the rotation shaft is turned in the second turning direction and the pin is abutted with the other end of the engaging projection in the circumferential direction, the power of the rotation shaft turning in the second turning direction is transmitted to the gear and, when the rotation shaft is turned by the power of the motor so that the pin is moved between the one end of the engaging projection and the other end of the engaging projection in the circumferential direction, transmission of the power of the rotation shaft to the gear is cut off. Further, in at least an embodiment of the present invention, when the rotation shaft is turned in the second turning direction from a state that the lock member is located at the contact position, the engaging state of the ratchet gear part with the ratchet member is released before the pin abutted with the one end of the engaging projection in the circumferential direction is moved and abutted with the other end of the engaging projection in the circumferential direction and the gear begins to turn in the second turning direction.

Therefore, according to at least an embodiment of the present invention, even when a drive source for driving the ratchet member is not provided separately, the ratchet gear part and the ratchet member are engaged with each other before movement of the lock member from the retreated position to the contact position is completed and, in addition, when the lock member is to be moved from the contact position to the retreated position, the engaging state of the ratchet gear part with the ratchet member can be released before the gear begins to turn in the second turning direction. Accordingly, in at least an embodiment of the present invention, the phishing can be prevented surely with a relatively simple structure. Further, in at least an embodiment of the present invention, when the cam member is contacted with the stopper, transmission of power of the rotation shaft to the cam member is cut off and thus the cam member is stopped. Therefore, when the lock member is to be moved from the contact position to the retreated position, the engaging state of the ratchet gear part with the ratchet member can be released at a relatively short time after the motor is activated and the cam member is started to turn together with the rotation shaft. Accordingly, in at least an embodiment of the present invention, when the lock member is to be moved from the contact position to the retreated position, the engaging state of the ratchet gear part with the ratchet member can be released surely before the gear begins to turn in the second turning direction.

In at least an embodiment of the present invention, for example, the rotation shaft, the cam member and the gear are coaxially disposed with each other. Further, in at least an embodiment of the present invention, for example, the torque limiter includes a torsion coil spring, the rotation shaft is inserted to an inner peripheral side of the torsion coil spring, and one end of the torsion coil spring is engaged with an inner peripheral side of the cam member.

In at least an embodiment of the present invention, it is preferable that the card lock mechanism includes a plurality of the ratchet members, and a plurality of holding shafts which respectively turnably hold the plurality of the ratchet member, a plurality of ratchet teeth is formed on an outer peripheral face of the ratchet gear part at an equal angular pitch with respect to a rotation center of the ratchet gear part, axial centers of the plurality of the holding shafts are disposed on a virtual circle with the rotation center of the ratchet gear part as a center and are disposed at an equal angular pitch with respect to the rotation center of the ratchet gear part, and an angle between the axial centers of the holding shafts with respect to the rotation center of the ratchet gear part is set to be larger than an angle between the ratchet teeth with respect to the rotation center of the ratchet gear part and is set to be a value other than integer multiples of the angle between the ratchet teeth with respect to the rotation center of the ratchet gear part. According to this structure, in comparison with a case that an angle between the axial centers of the holding shafts with respect to the rotation center of the ratchet gear part is set to be a value of integer multiples of an angle between the ratchet teeth with respect to the rotation center of the ratchet gear part, a backlash between the ratchet gear part and a plurality of the ratchet members can be reduced.

In at least an embodiment of the present invention, it is preferable that the ratchet gear part is formed of metal material, the ratchet member is formed of resin material, a plurality of ratchet teeth is formed on an outer peripheral face of the ratchet gear part, the ratchet member is provided with a plurality of engaging parts engagable with the ratchet tooth, the plurality of the engaging parts includes a first engaging part which is engaged with the ratchet tooth when the ratchet gear part and the ratchet member are engaged with each other, and a second engaging part which is engaged with the ratchet tooth when a turning force in the second turning direction acts on the gear and the first engaging part is resiliently bent in a state that the ratchet tooth and the first engaging part are engaged with each other. According to this structure, the ratchet gear part formed of metal material and the ratchet member formed of resin material are engaged with each other. Therefore, in comparison with a case that the ratchet member is formed of metal material, damage of the ratchet gear part can be prevented when the ratchet gear part and the ratchet member are engaged with each other. Further, according to this structure, since the ratchet member is formed of resin material, cost of the ratchet member can be reduced. On the other hand, in a case that the ratchet member is formed of resin material, when the lock member is pushed from the contact position toward the retreated position and a turning force in the second direction is acted on the gear, the first engaging part engaged with the ratchet tooth is resiliently bent and the engaging state of the ratchet gear part with the ratchet member may be released. However, according to this structure, when a turning force in the second turning direction is acted on the gear in a state that the ratchet tooth and the first engaging part are engaged with each other and the first engaging part is bent resiliently, the ratchet tooth and the second engaging part are engaged with each other. Therefore, even when the lock member is pushed from the contact position toward the retreated position and the first engaging part of the ratchet member made of resin is resiliently bent, an engaging state of the ratchet gear part and the ratchet member can be maintained by the first engaging part and the second engaging part.

In at least an embodiment of the present invention, it is preferable that a plurality of ratchet teeth is formed on an outer peripheral face of the ratchet gear part, the ratchet member is provided with a first engaging part which is capable of contacting with the ratchet tooth and being engaged with the ratchet tooth, and a contact face of the ratchet tooth with the first engaging part and a contact face of the first engaging part with the ratchet tooth are formed in curved faces whose curvatures are substantially equal to each other. According to this structure, a contact area of the ratchet tooth and the first engaging part can be made wide. Therefore, even in a case that an impact is applied to the card reader when the ratchet tooth and the first engaging part are engaged with each other, an engaging state of the ratchet tooth and the first engaging part is hard to be released.

In at least an embodiment of the present invention, it is preferable that the card lock mechanism includes a holding shaft which turnably holds the ratchet member, a plurality of ratchet teeth is formed on an outer peripheral face of the ratchet gear part, and the ratchet member includes a shaft insertion part into which the holding shaft is inserted, a ratchet part which is formed with a first engaging part engagable with the ratchet tooth on its tip end side and is extended from the shaft insertion part to one side in a direction perpendicular to an axial direction of the holding shaft, and a counterbalance part which is extended from the shaft insertion part in an opposite direction to the ratchet part. According to this structure, a moment is hard to be generated in the ratchet member with the holding shaft as a center by an operation of the counterbalance part. Therefore, even when an impact is applied to the card reader in a case that the ratchet tooth and the first engaging part are engaged with each other, the ratchet member is hard to be turned with the holding shaft as a center and, as a result, an engaging state of the ratchet tooth and the first engaging part is hard to be released.

To achieve the above mentioned objective, at least an embodiment of the present invention provides a card reader including a card insertion port into which a card is inserted and from which the card is ejected, a card conveying passage where the card inserted from the card insertion port is conveyed, and a card lock mechanism structured to prevent drawing of the card from the card insertion port when the card is abnormally stopped in the card conveying passage and the card is clogged in the card conveying passage. In a case that an inserting direction of the card is referred to as a first direction, an ejecting direction of the card is referred to as a second direction, one side in a thickness direction of the card conveyed along the card conveying passage is referred to as a third direction, the other side in the thickness direction of the card is referred to as a fourth direction, and a direction perpendicular to the first direction and the third direction is referred to as a fifth direction, the card lock mechanism includes a lock member formed with a prevention part structured to contact with the card for preventing drawing of the card, and a fixed shaft which turnably holds the lock member or a turnable shaft which turns together with the lock member. The lock member is disposed on a third direction side relative to the card conveying passage, the fixed shaft or the turnable shaft is disposed so that its axial direction is coincided with the fifth direction and is disposed on the third direction side and a second direction side relative to the prevention part, the lock member is turnable between a contact position where the prevention part is contacted with the card and a retreated position where the prevention part is retreated from the card conveying passage with the fixed shaft or the turnable shaft as a turning center. When the lock member located at the contact position begins to turn toward the retreated position, the prevention part is moved in substantially the first direction and, when the lock member is located at the contact position, the prevention part includes a first prevention part which is inclined to a first direction side toward a fourth direction side, and a second prevention part which is disposed on a second direction side relative to the first prevention part and is inclined to the second direction side toward the fourth direction side.

In the card reader in accordance with at least an embodiment of the present invention, the lock member is formed with a prevention part structured to contact with the card for preventing drawing of the card and is disposed on a third direction side that is one side in the thickness direction of the card relative to the card conveying passage. Further, when the lock member is located at the contact position where the prevention part is contacted with a card, the prevention part includes a first prevention part which is inclined to a first direction side, i.e., to an inserting direction side of a card toward a fourth direction side, i.e., the other side in a thickness direction of the card, and a second prevention part which is disposed on a second direction side, i.e., an ejecting direction side of the card, relative to the first prevention part and is inclined to the second direction side toward the fourth direction side. Therefore, according to at least an embodiment of the present invention, when a criminal pushes the lock member in the first direction by using a foreign matter inserted from the card insertion port, the lock member is moved so that the second prevention part sticks into the card. Accordingly, in at least an embodiment of the present invention, drawing of a card from the card insertion port can be prevented after a criminal pushes the lock member in the first direction by using a foreign matter. Further, in at least an embodiment of the present invention, when a criminal draws a card in the second direction in a state that the prevention part is contacted with the card (in other words, when the card is drawn to the card insertion port side), the lock member is moved so that the first prevention part sticks into the card similarly to the conventional technique. Therefore, also in this case, drawing of a card from the card insertion port can be prevented. Accordingly, in at least an embodiment of the present invention, the phishing can be surely prevented with a relatively simple structure by providing the first prevention part and the second prevention part.

In at least an embodiment of the present invention, it is preferable that the card reader includes a conveying roller structured to abut with the card and convey the card, and a pad roller which is oppositely disposed to the conveying roller in the thickness direction of the card and is urged toward the conveying roller. The conveying roller is disposed so as to face the card conveying passage from the third direction side, the pad roller is disposed so as to face the card conveying passage from the fourth direction side, a fourth direction end of the conveying roller and a center position of the card conveying passage in the thickness direction of the card are substantially coincided with each other in the thickness direction of the card, the pad roller is moved in the fourth direction when the second prevention part is contacted with the card and, when the lock member is located at the contact position, a fourth direction end of the first prevention part and a fourth direction end of the second prevention part are disposed on the fourth direction side relative to the center position of the card conveying passage in the thickness direction of the card, the lock member is formed with an abutting face which is disposed on the second direction side and the third direction side relative to the second prevention part and is disposed at substantially the same position as the center position of the card conveying passage in the thickness direction of the card when the lock member is located at the contact position, and a distance from the fixed shaft or the turnable shaft to the abutting face is set to be shorter than a distance from the fixed shaft or the turnable shaft to the second prevention part.

According to this structure, when the lock member is located at the contact position, a fourth direction end of the first prevention part and a fourth direction end of the second prevention part are disposed on the fourth direction side relative to the center position of the card conveying passage in the thickness direction of the card, and an abutting face which is disposed on the second direction side and the third direction side relative to the second prevention part is disposed at substantially the same position as the center position of the card conveying passage in the thickness direction of the card and thus, a foreign matter which is inserted from the card insertion port by a criminal is easily contacted with the abutting face. Further, according to this structure, a distance from the fixed shaft or the turnable shaft to the abutting face is set to be shorter than a distance from the fixed shaft or the turnable shaft to the second prevention part. Therefore, in comparison with a moment acted on the lock member with the fixed shaft or the turnable shaft as a center when a foreign matter is contacted with the second prevention part, a moment acted on the lock member with the fixed shaft or the turnable shaft as a center can be reduced when the foreign matter is contacted with the abutting face. Accordingly, even when a criminal inserts a foreign matter from the card insertion port, the lock member located at the contact position is hard to be turned toward the retreated position.

In at least an embodiment of the present invention, for example, the first prevention part and the second prevention part are formed in a triangular shape whose width becomes narrower toward its tip end side when viewed in the fifth direction.

In at least an embodiment of the present invention, it is preferable that the card reader includes a turning prevention mechanism structured to prevent turning of the lock member when the lock member is located at the contact position. According to this structure, even when a criminal tries to move the lock member in the first direction with a strong force by using a foreign matter inserted from the card insertion port, the prevention part can be prevented from being moved to a state that a contact state of the prevention part and the card is released. Therefore, the phishing can be prevented further surely.

As described above, in the card reader in accordance with at least an embodiment of the present invention, the phishing can be surely prevented with a relatively simple structure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 5 is a cross-sectional view showing the "E-E" cross section in FIG. 4.

FIGS. 9(A) and 9(B) are explanatory views showing a state after a lock member shown in FIG. 3 has been moved from a contact position to a retreated position.

FIGS. 10(A) and 10(B) are explanatory views showing a state when a pin is abutted with one end faces of engaging projections after a rotation shaft and a cam member are turned in a first turning direction from the state shown in FIGS. 9(A) and 9(B).

FIGS. 12(A) and 12(B) are explanatory views showing a state when a second prevention pawl of a lock member begins to contact with a card after the rotation shaft and the gear are turned in the first turning direction from the state shown in FIGS. 11(A) and 11(B).

FIGS. 13(A) and 13(B) are explanatory views showing a state when the lock member has reached to a contact position after the rotation shaft and the gear are turned in the first turning direction from the state shown in FIGS. 12(A) and 12(B).

FIGS. 14(A) and 14(B) are explanatory views showing a state when the pin is abutted with the other end faces of the engaging projections after the rotation shaft and the cam member are turned in a second turning direction from the state shown in FIGS. 13(A) and 13(B).

FIG. 15 is an explanatory view showing a state of a front end side of the card reader when a card is prevented from being drawn by a prevention part shown in FIG. 3.

FIG. 17 is a perspective view showing a gear and ratchet members shown in FIG. 16.

FIG. 18 is an explanatory view showing a structure of a ratchet gear part and the ratchet member shown in FIG. 17.

DESCRIPTION OF EMBODIMENTS

Embodiments of the present invention will be described below with reference to the accompanying drawings.
(Schematic Structure of Card Reader)

Figure 1:
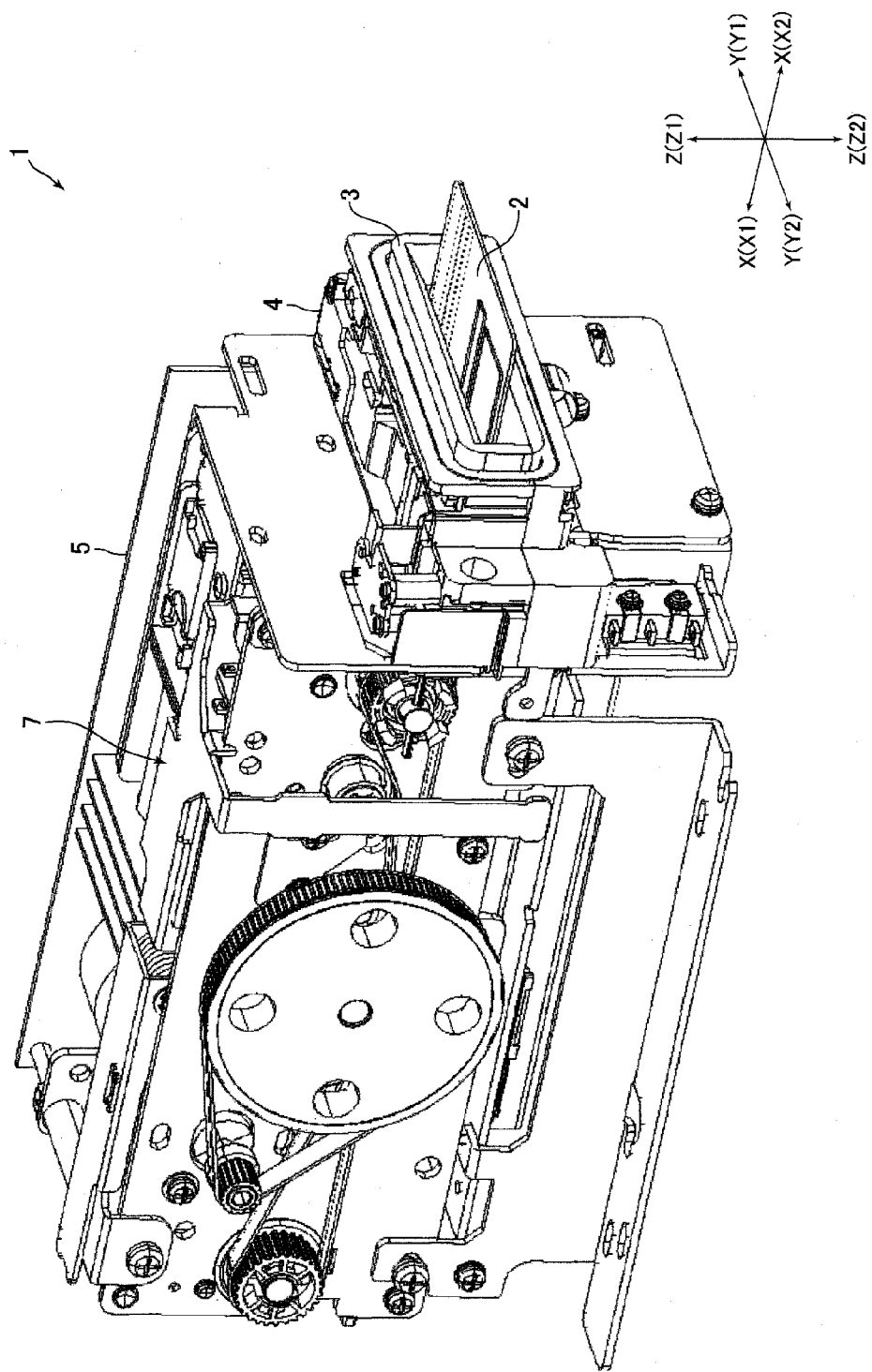
FIG. 1 is a perspective view showing a card reader in accordance with an embodiment of the present invention.
Figure 2:
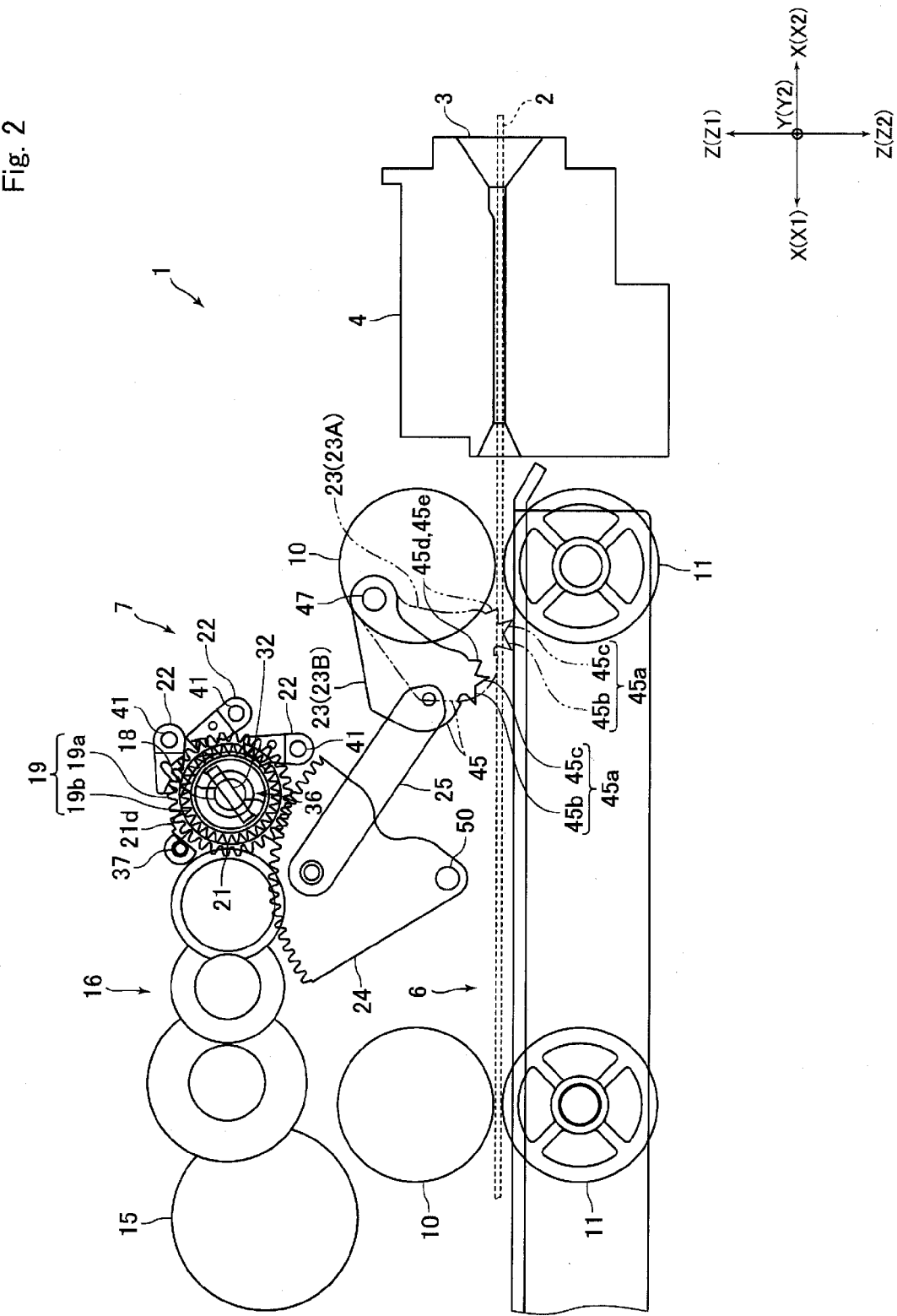
FIG. 2 is an explanatory view showing a structure of a front end side of the card reader shown in FIG. 1.

FIG. 1 is a perspective view showing a card reader 1 in accordance with an embodiment of the present invention. FIG. 2 is an explanatory view showing a structure of a front end side of the card reader 1 shown in FIG. 1.

A card reader 1 in this embodiment is a device for reading data recorded in a card 2 and/or recording data to a card 2. For example, the card reader 1 is mounted on a predetermined host device such as an ATM for use. The card reader 1 includes a card insertion part 4 formed with a card insertion port 3 into which a card 2 is inserted and from which the card 2 is ejected and a main body part 5. A card conveying passage 6 where a card 2 inserted through the card insertion port 3 is conveyed is formed in an inside of the card reader 1. Further, the card reader 1 includes a card lock mechanism 7 for preventing drawing of a card 2 from the card insertion port 3 when the card 2 is abnormally stopped and clogged in the card conveying passage 6 by a fraudulent act or the like of a criminal.

In this embodiment, a card 2 is conveyed in an "X" direction in FIG. 1 and the like. Specifically, a card 2 is inserted into in an "X1" direction and the card 2 is ejected in an "X2" direction. In other words, an "X1" direction is an inserting direction of a card 2 and an "X2" direction is an ejecting direction of the card 2. Further, a "Z" direction shown in FIG. 1 and the like perpendicular to the "X" direction is a thickness direction of a card 2 conveyed along the card conveying passage 6. A "Y" direction in FIG. 1 and the like perpendicular to the "X" direction and the "Z" direction is a width direction (short widthwise direction) of a card 2 conveyed along the card conveying passage 6. In the following descriptions, the "X1" direction side is referred to as a "back (rear)" side, the "X2" direction side is referred to as a "front" side, a "γ1" direction side as a "right" side, a "Y2" direction side as a "left" side, a "Z1" direction side as an "upper" side, and a "Z2" direction side as a "lower part" side. In this embodiment, the "X1" direction is a first direction, the "X2" direction is a second direction, the "Z1" direction is a third direction, the "Z2" direction is a fourth direction, and the "Y" direction is a fifth direction.

A card 2 is, for example, a rectangular card made of vinyl chloride whose thickness is about 0.7-0.8 mm. The card 2 is, for example, formed with a magnetic stripe in which magnetic data are recorded. Further, for example, an IC chip is incorporated in the card 2. In accordance with an embodiment of the present invention, an antenna for communication may be incorporated in the card 2. Further, the card 2 may be a PET (polyethylene terephthalate) card whose thickness is about 0.18-0.36 mm or may be a paper card having a predetermined thickness.

The card insertion part 4 is attached to a front end face of the main body part 5. The main body part 5 includes a magnetic head for performing reading and recording of magnetic data, IC contacts for performing data communication with an IC chip incorporated in a card 2 and the like. Further, the main body part 5 includes a conveying roller 10 structured to abut with a card 2 and convey the card 2 and a pad roller 11 which is oppositely disposed to the conveying roller 10 in an upper and lower direction. The conveying roller 10 is disposed so as to face the card conveying passage 6 from an upper side. The pad roller 11 is disposed so as to face the card conveying passage 6 from a lower side.

A rotation center of the conveying roller 10 is fixed. On the other hand, the pad roller 11 is urged toward the conveying roller 10 by an urging member not shown and a rotation center of the pad roller 11 is movable in an upper and lower direction. In other words, the pad roller 11 is movable in the upper and lower direction. When there is no card 2 in the card conveying passage 6, an upper end of the pad roller 11 is contacted with a lower end of the conveying roller 10. Further, in a case that a card 2 is conveyed, the pad roller 11 is moved downward by a thickness of the card 2 and the conveying roller 10 is abutted with an upper face of the card 2 and the pad roller 11 is abutted with an under face of the card 2. In other words, the card 2 is conveyed in a sandwiched state between the conveying roller 10 and the pad roller 11 in the upper and lower direction. In this embodiment, in the upper and lower direction, a lower end of the conveying roller 10 is substantially coincided with a center position in the upper and lower direction of the card conveying passage 6.

(Structure of Card Lock Mechanism)

Figure 3:
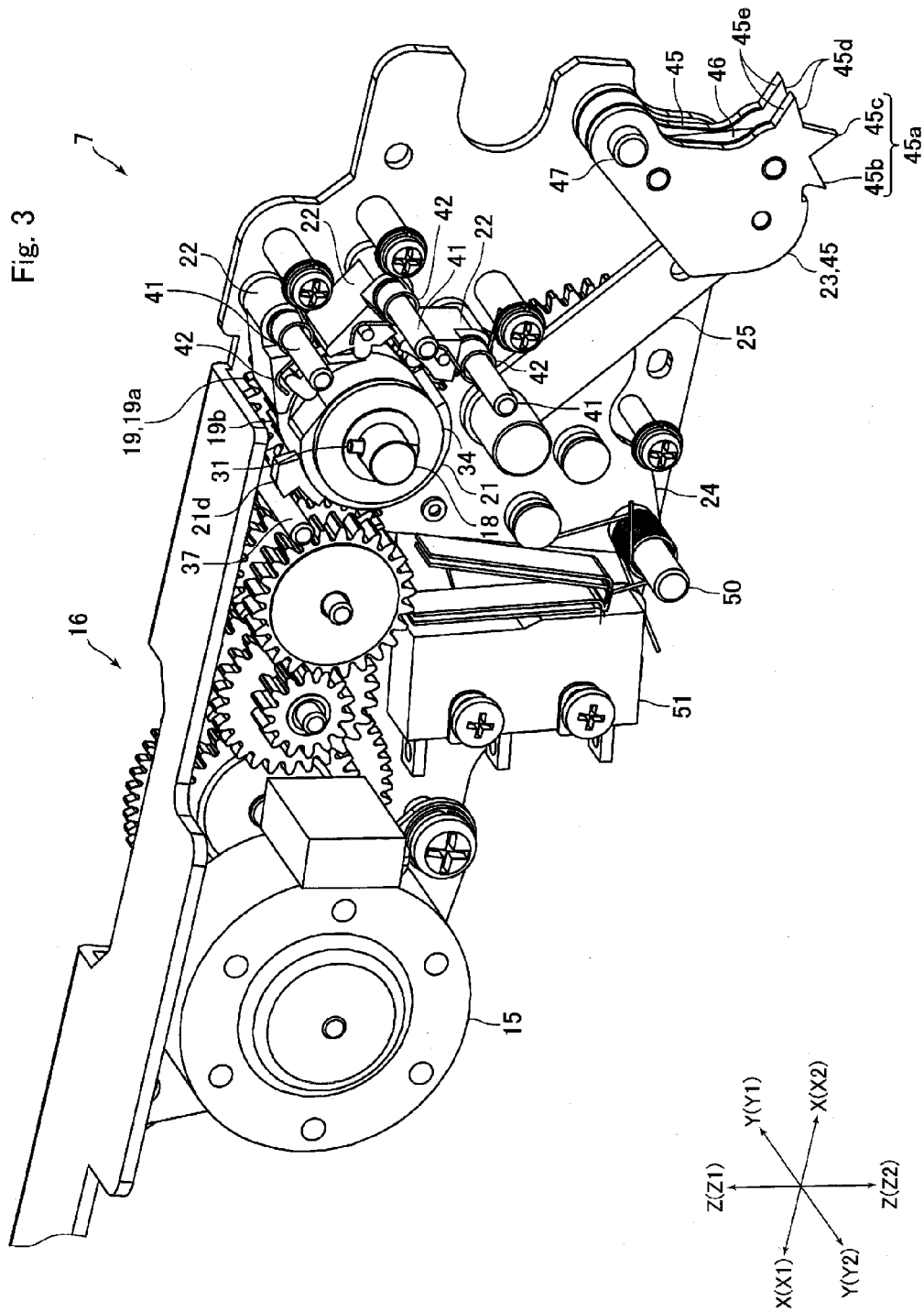
FIG. 3 is a perspective view showing a card lock mechanism in FIG. 2.
Figure 4:
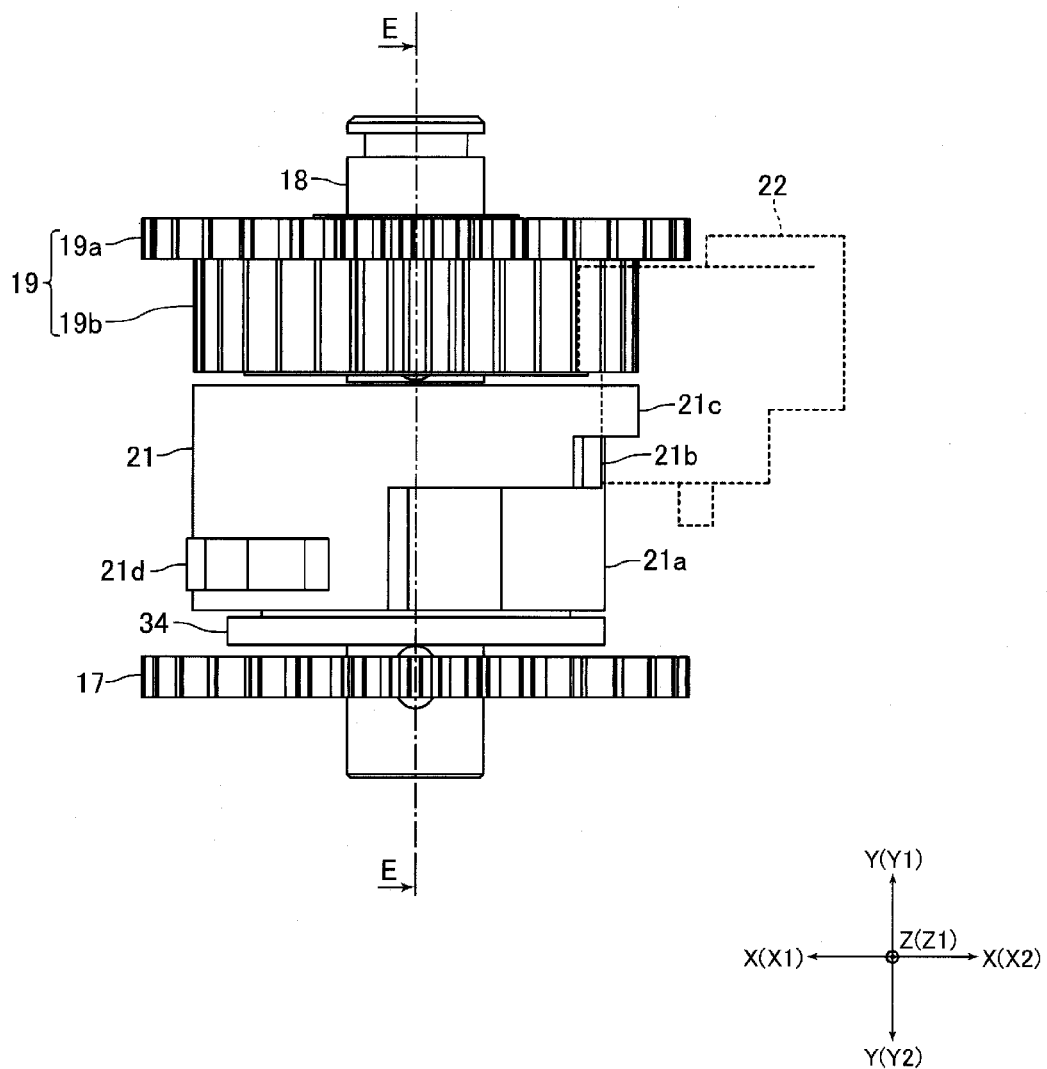
FIG. 4 is a plan view showing a rotation shaft, a gear, a cam member and the like shown in FIG. 3.
Figure 6:
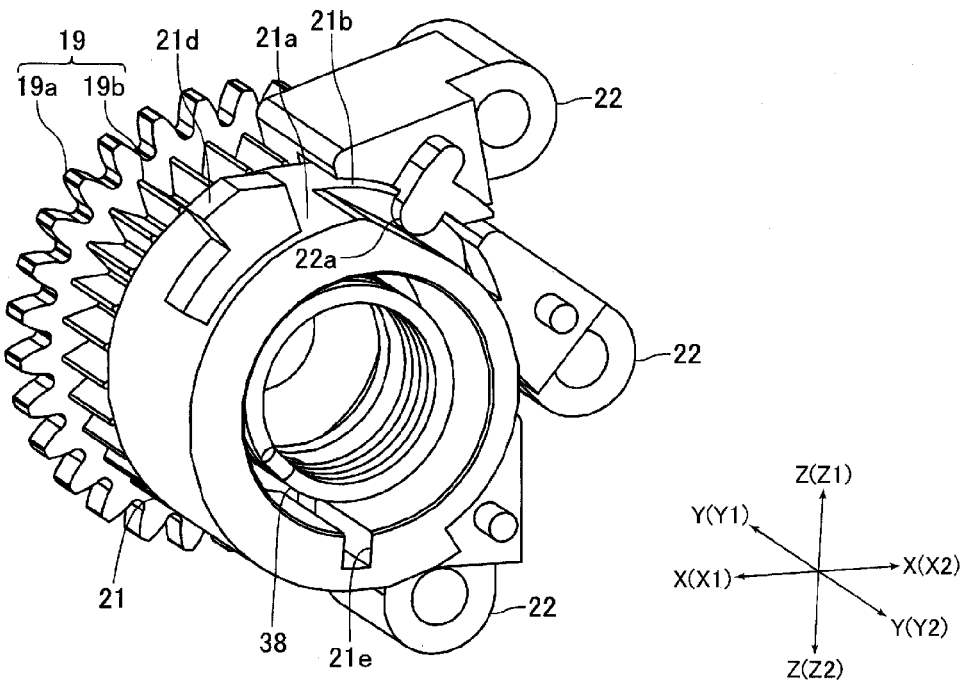
FIG. 6 is an explanatory perspective view showing a structure of the gear, the cam member and a ratchet member shown in FIG. 3.
Figure 7:
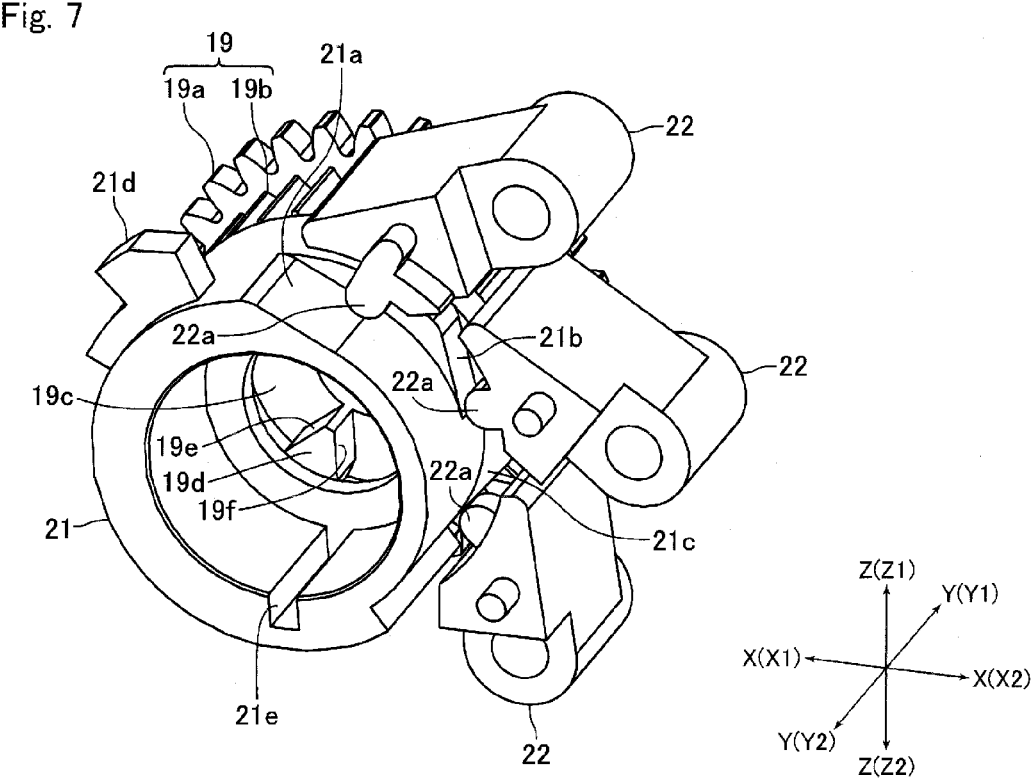
FIG. 7 is an explanatory perspective view showing the structure of the gear, the cam member and the ratchet member shown in FIG. 3.
Figure 8:
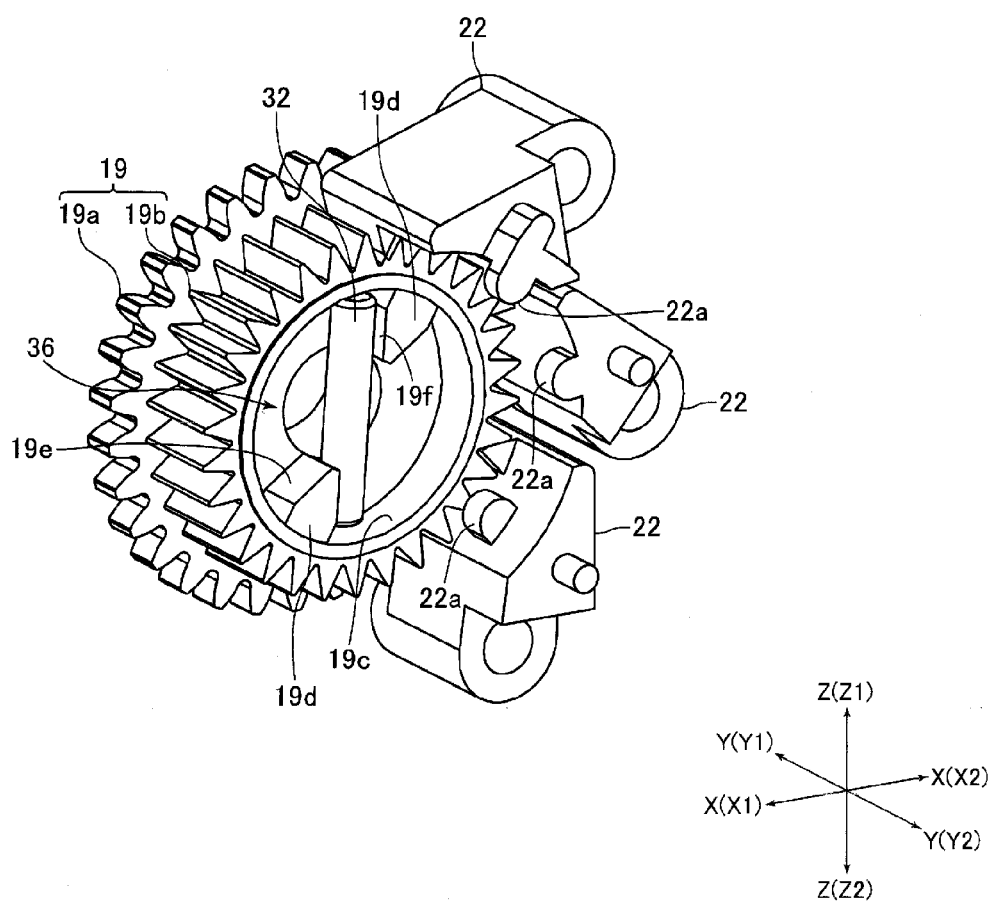
FIG. 8 is an explanatory perspective view showing a structure of the gear and the ratchet member shown in FIG. 3.

FIG. 3 is a perspective view showing a card lock mechanism 7 in FIG. 2. FIG. 4 is a plan view showing a rotation shaft 18, a gear 19, a cam member 21 and the like shown in FIG. 3. FIG. 5 is a cross-sectional view showing the "E-E" cross section in FIG. 4. FIGS. 6 through 8 are explanatory perspective views showing a structure of a gear 19, a cam member 21 and ratchet members 22 shown in FIG. 3.

The card lock mechanism 7 is disposed to an upper side of the card conveying passage 6. The card lock mechanism 7 includes a motor 15, a gear train 16 connected with an output shaft of the motor 15, a rotation shaft 18 rotated together with a final gear 17 structuring the gear train 16, a gear 19 having a power transmission gear part 19a for power transmission and a ratchet gear part 19b integrally rotated with the power transmission gear part 19a, a cam member 21 in a substantially cylindrical shape formed with cam faces 21a through 21c on its outer peripheral face, three ratchet members 22 structured to engage with the ratchet gear part 19b for preventing turning of the gear 19, a lock member 23 for preventing drawing of a card 2, and a fan-shaped gear 24 and a connecting lever 25 for transmitting power of the power transmission gear part 19a to the lock member 23.

In this embodiment, the gear 19 and the cam member 21 are held by the rotation shaft 18 so as to be relatively turnable. Further, the rotation shaft 18, the gear 19 and the cam member 21 are coaxially disposed with each other. In other words, a rotation center of the rotation shaft 18, a rotation (turning) center of the gear 19, and a rotation (turning) center of the cam member 21 are coincided with each other. In the following descriptions, a "radial direction" denotes radial directions of the rotation shaft 18, the gear 19 and the cam member 21 and a "circumferential direction" denotes circumferential directions of the rotation shaft 18, the gear 19 and the cam member 21. Further, in the following descriptions, a "clockwise direction" denotes a clockwise direction in FIG. 2 and a "counterclockwise direction" denotes a counterclockwise direction in FIG. 2.

The rotation shaft 18 is disposed so that its axial direction and the right and left direction are coincided with each other. Further, the rotation shaft 18 is rotatably held by a frame of the card lock mechanism 7. As shown in FIG. 5, a pin 31 is attached to a left end side of the rotation shaft 18 and a pin 32 is attached to a right end side of the rotation shaft 18.

Further, a pin 33 is attached between the pin 31 and the pin 32 in the right and left direction. The pins 31 through 33 are attached to the rotation shaft 18 so that axial directions of the pins 31 through 33 and the radial direction are coincided with each other (in other words, so that axial directions of the pins 31 through 33 pass through an axial center of the rotation shaft 18). Further, both end parts of the pins 31 through 33 are protruded to both sides in the radial direction of the rotation shaft 18.

The pin 31 is disposed in an engagement hole 17a formed at a center of the final gear 17 (see FIG. 5) and the pin 31 functions to transmit power of the final gear 17 to the rotation shaft 18. When the motor 15 is driven, power of the motor 15 is transmitted to the rotation shaft 18 through the gear train 16 and the pin 31 and the rotation shaft 18 is rotated. In other words, the rotation shaft 18 is rotated by power of the motor 15. In FIG. 3, the final gear 17 is not shown.

As shown in FIG. 5, a sleeve 34 made of resin and formed in a substantially cylindrical tube shape with a flange is disposed between the pin 31 and the pin 32 in the right and left direction. The rotation shaft 18 is passed through an inner peripheral side of the sleeve 34. Both end parts of the pin 33 are respectively inserted into the sleeve 34 and thus the sleeve 34 is integrally rotated with the rotation shaft 18.

The gear 19 is structured of the power transmission gear part 19a and the ratchet gear part 19b. The power transmission gear part 19a and the ratchet gear part 19b are integrally formed with each other. Further, the power transmission gear part 19a and the ratchet gear part 19b are coaxially disposed and a rotation center of the power transmission gear part 19a and a rotation center of the ratchet gear part 19b are coincided with each other. The rotation centers of the power transmission gear part 19a and the ratchet gear part 19b are the same as the rotation center of the gear 19. An outer diameter of the power transmission gear part 19a is larger than an outer diameter of the ratchet gear part 19b. Further, the power transmission gear part 19a is disposed to the right side of the ratchet gear part 19b. In accordance with an embodiment of the present invention, it may be structured that the power transmission gear part 19a and the ratchet gear part 19b are separately formed from each other and then fixed to each other.

A plurality of ratchet teeth is formed on an outer peripheral face of the ratchet gear part 19b at an equal angular pitch with respect to the rotation center of the ratchet gear part 19b. In this embodiment, thirty (30) ratchet teeth are formed at a pitch of 12° with respect to the rotation center of the ratchet gear part 19b. Further, the ratchet teeth are formed so that, when the ratchet gear part 19b and the ratchet members 22 are engaged with each other, turning of the gear 19 in the clockwise direction is prevented and turning of the gear 19 in the counterclockwise direction is permitted.

A left end face of the gear 19 is, as shown in FIG. 8, formed with a recessed part 19c which is recessed toward the right side. Two engagement projections 19d are formed in the recessed part 19c so as to protrude from an outer side end in the radial direction of the recessed part 19c to an inner side in the radial direction. Two engagement projections 19d are formed at a pitch of 180° with respect to the rotation center of the gear 19. A shape of the engagement projection 19d when viewed in the right and left direction is a substantially triangular shape whose inner side end in the radial direction is formed in a pointed shape. End faces (one end face) 19e in the clockwise direction of two engagement projections 19d are parallel to each other and end faces (the other end face) 19f in the counterclockwise direction of two engagement projections 19d are parallel to each other.

The pin 32 is disposed in the recessed part 19c and the pin 32 is capable of engaging with both ends (in other words, one end face 19e and the other end face 19f) in a circumferential direction of the engagement projection 19d. In this embodiment, a pin clutch 36 is structured of the pin 32 and the engagement projections 19d. The pin clutch 36 is operated so that, when the rotation shaft 18 is turned in the counterclockwise direction by power of the motor 15 and the pin 32 is abutted with two one end faces 19e, the power of the rotation shaft 18 turned in the counterclockwise direction is transmitted to the gear 19 and, when the rotation shaft 18 is turned in the clockwise direction by the power of the motor 15 and the pin 32 is abutted with two other end faces 19f, the power of the rotation shaft 18 turned in the clockwise direction is transmitted to the gear 19. Further, when the rotation shaft 18 is turned by power of the motor 15 so that the pin 32 is moved between the one end face 19e and the other end face 19f in a circumferential direction, the pin clutch 36 is operated so as to cut off transmission of the power of the rotation shaft 18 to the gear 19. A turning angle of the rotation shaft 18 (idle angle of the rotation shaft 18) where transmission of power of the rotation shaft 18 to the gear 19 is cut off is, for example, 126°. The pin clutch 36 in this embodiment is a clutch mechanism disposed between the rotation shaft 18 and the gear 19 in a transmission direction of power from the motor 15.

The cam member 21 is disposed between the final gear 17 and the gear 19 in the right and left direction. Further, as shown in FIG. 5, the cam member 21 is disposed to an outer peripheral side of the sleeve 34. The cam faces 21a through 21c are formed on an outer peripheral face of the cam member 21 as described above. Further, an outer peripheral face of the cam member 21 is formed with a projecting part 21d protruded to an outer side in the radial direction. An inner peripheral face of the cam member 21 is formed with a straight-shaped groove part 21e which is formed from a left end of the cam member 21 toward the right end side.

The cam faces 21a through 21c are formed at positions displaced from each other in the right and left direction. In this embodiment, the cam face 21a is formed on the left end side of the cam member 21, the cam face 21c is formed on the right end side of the cam member 21, and the cam face 21b is formed between the cam face 21a and the cam face 21c in the right and left direction. Further, the cam faces 21a through 21c are formed at positions displaced from each other in the circumferential direction. In this embodiment, the cam faces 21a through 21c are formed in this order in the clockwise direction. The cam faces 21a through 21c are respectively contacted with cam followers 22a described below which are formed in three ratchet members 22. The cam member 21 functions to move the ratchet member 22 between a position where the ratchet gear part 19b and the ratchet member 22 are engaged with each other and a position where an engaging state of the ratchet gear part 19b with the ratchet member 22 is released. The ratchet members 22 are turned with holding axes 41 described below as turning centers along the cam faces 21a through 21c. The cam faces 21a through 21c in this embodiment are formed so that three ratchet members 22 are performed with the same motion.

The projecting part 21d is formed to a counterclockwise direction side of the cam face 21a. A frame of the card lock mechanism 7 is, as shown in FIG. 3, fixed with a stopper 37 which restricts a turnable range of the cam member 21. The stopper 37 is formed in a long and thin cylindrical shape and is disposed so that its axial direction and the right and left direction are coincided with each other. In this embodiment, when the cam member 21 is turned in the counterclockwise direction from a state that the lock member 23 is located at a retreated position 23B described below, the projecting part 21d is contacted with the stopper 37 and a turnable range of the cam member 21 in the counterclockwise direction is restricted.

A torsion coil spring 38 is disposed between an inner peripheral face of the cam member 21 and an outer peripheral face of the sleeve 34 in the radial direction. In other words, the rotation shaft 18 and the sleeve 34 are inserted and passed through an inner peripheral side of the torsion coil spring 38. An inner diameter of the torsion coil spring 38 is set smaller than an outer diameter of the sleeve 34 and an inner peripheral face of the torsion coil spring 38 and an outer peripheral face of the sleeve 34 are contacted with each other with a predetermined contact pressure. One end of the torsion coil spring 38 is, as shown in FIG. 6, engaged with the groove part 21e of the cam member 21. In other words, one end of the torsion coil spring 38 is engaged with an inner peripheral side of the cam member 21.

In this embodiment, the torsion coil spring 38 is wound so that, when the sleeve 34 is turned in the clockwise direction together with the rotation shaft 18, the torsion coil spring 38 is tightened (in other words, the diameter of the torsion coil spring 38 becomes smaller) and, when the sleeve 34 is turned in the counterclockwise direction together with the rotation shaft 18, the torsion coil spring 38 is loosened (in other words, the diameter of the torsion coil spring 38 becomes larger). Further, in this embodiment, when the rotation shaft 18 is turned in the counterclockwise direction from a state that the lock member 23 is located at a retreated position 23B described below, the torsion coil spring 38 transmits power of the rotation shaft 18 to the cam member 21 until the projecting part 21d is contacted with the stopper 37 and, when the projecting part 21d is contacted with the stopper 37, transmission of power of the rotation shaft 18 to the cam member 21 is cut off. Further, when the rotation shaft 18 is turned in the clockwise direction from a state that the lock member 23 is located at a contact position 23A described below, the torsion coil spring 38 transmits power of the rotation shaft 18 to the cam member 21. In this embodiment, a torque limiter is structured of the torsion coil spring 38 which is disposed between the rotation shaft 18 and the cam member 21 in a transmission direction of power from the motor 15.

The ratchet member 22 is, as shown in FIG. 3, turnably held by a holding shaft 41 which is fixed to a frame of the card lock mechanism 7. In other words, the card lock mechanism 7 includes three holding shafts 41 which respectively turnably hold three ratchet members. The three holding shafts 41 are disposed so that their axial directions and the right and left direction are coincided with each other. Further, axial centers of the three holding shafts 41 are disposed on a virtual circle with the rotation center of the ratchet gear part 19b as a center. The holding shafts 41 are disposed at three positions, i.e., an obliquely upper front side, a front side, an obliquely lower front side with respect to the ratchet gear part 19b.

The ratchet members 22 are formed with cam followers 22a structured to contact with the cam faces 21a through 21c. The cam followers 22a which are respectively formed on the three ratchet members 22 are formed at positions displaced from each other in the right and left direction so as to respectively contact with the cam faces 21a through 21c. Specifically, the ratchet member 22 which is held by the holding shaft 41 disposed to the obliquely upper front side of the ratchet gear part 19*b* is formed with the cam follower 22*a* contacting with the cam face 21*a*, the ratchet member 22 which is held by the holding shaft 41 disposed to the front side of the ratchet gear part 19*b* is formed with the cam follower 22*a* contacting with the cam face 21*b*, and the ratchet member 22 which is held by the holding shaft 41 disposed to the obliquely lower front side of the ratchet gear part 19*b* is formed with the cam follower 22*a* contacting with the cam face 21*c*.

The ratchet member 22 is, as shown in FIG. 3, urged by a torsion coil spring 42 as an urging member in the counterclockwise direction with the holding shaft 41 as a center. The cam followers 22*a* are contacted with the cam faces 21*a* through 21*c* by urging forces of the torsion coil springs 42. In other words, the torsion coil springs 42 urge the ratchet members 22 in directions that the cam followers 22*a* are contacted with the cam faces 21*a* through 21*c*. Further, the torsion coil spring 42 urges the ratchet member 22 in a direction that the ratchet gear part 19*b* and a tip end part of the ratchet member 22 are engaged with each other. In this embodiment, the ratchet members 22 are turned with the holding shafts 41 as centers between a position engaged with the ratchet gear part 19*b* and a position where an engaging state with the ratchet gear part 19*b* is released by operations of the torsion coil springs 42, the cam faces 21*a* through 21*c* and the cam followers 22*a*. A tip end part of the ratchet member 22 is formed so that, when the ratchet gear part 19*b* and the ratchet member 22 are engaged with each other, turning of the gear 19 in the clockwise direction is prevented and turning of the gear 19 in the counterclockwise direction is permitted.

The axial centers of three holding shafts 41 are, as described above, disposed on a virtual circle with the rotation center of the ratchet gear part 19*b* as a center. An angle between the axial centers of the holding shafts 41 with respect to the rotation center of the ratchet gear part 19*b* is set to be larger than an angle between ratchet teeth with respect to the rotation center of the ratchet gear part 19*b*. Further, the angle between the axial centers of the holding shafts 41 with respect to the rotation center of the ratchet gear part 19*b* is set to be a value other than integer multiples of the angle between the ratchet teeth with respect to the rotation center of the ratchet gear part 19*b*. In this embodiment, the angle between the axial centers of the holding shafts 41 with respect to the rotation center of the ratchet gear part 19*b* is 52°. Therefore, in this embodiment, in a case that one ratchet member 22 and the ratchet gear part 19*b* are completely engaged with each other, two remaining ratchet members 22 and the ratchet gear part 19*b* are not completely engaged with each other. In other words, in this embodiment, the phase of the three ratchet members 22 and the phase of the ratchet teeth are displaced from each other.

The lock member 23 is disposed to a front side and a lower side of the gear 19. Further, the lock member 23 is disposed to an upper side of the card conveying passage 6. The lock member 23 is, as shown in FIG. 3, structured of two lock plates 45, which are formed with prevention parts 45*a* structured to contact with a card 2 and prevent drawing of the card 2, and a spacer 46 which is disposed between the two lock plates 45. The lock plate 45 is formed in a flat plate shape perpendicular to the right and left direction. The spacer 46 is formed in a thick plate shape which is thicker than the lock plate 45. The two lock plates 45 are fixed to each other in a state that the spacer 46 is sandwiched therebetween. A front and upper end side of the lock member 23 is turnably held by a fixed shaft 47 which is fixed to the frame of the card lock mechanism 7. The fixed shaft 47 is disposed so that its axial direction and the right and left direction are coincided with each other.

The prevention part 45*a* is formed on a lower end side of the lock plate 45. In other words, the prevention part 45*a* is disposed to a lower side of the fixed shaft 47. Further, the prevention part 45*a* is disposed to a rear side of the fixed shaft 47. The prevention part 45*a* is provided with a first prevention pawl 45*b* as the first prevention part and a second prevention pawl 45*c* as the second prevention part which is disposed to a front side of the first prevention pawl 45*b*. The first prevention pawl 45*b* and the second prevention pawl 45*c* are formed in a triangular shape whose width becomes narrower toward its tip end side when viewed in the right and left direction. Further, an angle of a tip end of the first prevention pawl 45*b* and an angle of a tip end of the second prevention pawl 45*c* are set to be acute angles.

The fan-shaped gear 24 is disposed to a rear side of the lock member 23. Further, the fan-shaped gear 24 is disposed to an obliquely lower rear side of the gear 19. An upper end of the fan-shaped gear 24 is formed with a plurality of teeth which are engaged with a lower rear end side of the power transmission gear part 19*a* of the gear 19. A lower end side of the fan-shaped gear 24 is turnably held by the fixed shaft 50 which is fixed to the frame of the card lock mechanism 7. The fixed shaft 50 is disposed so that its axial direction and the right and left direction are coincided with each other. The connecting lever 25 is formed in a straight shape. One end side of the connecting lever 25 is turnably connected with an upper end side of the fan-shaped gear 24 and the other end side of the connecting lever 25 is turnably connected with a rear and lower end side of the lock member 23.

The lock member 23 is movable between a contact position 23A (position shown by the two-dot chain line in FIG. 2) where the prevention part 45*a* is contacted with a card 2 and a retreated position 23B (position shown by the solid line in FIG. 2) where the prevention part 45*a* is retreated from the card conveying passage 6 by power transmitted from the power transmission gear part 19*a* through the fan-shaped gear 24 and the connecting lever 25. In other words, the lock member 23 is capable of turning between the contact position 23A and the retreated position 23B with the fixed shaft 47 as a turning center by power transmitted from the power transmission gear part 19*a*. When the lock member 23 is located at the retreated position 23B, the prevention part 45*a* is disposed to an upper side of the card conveying passage 6 and does not contact with a card 2.

In this embodiment, when the power transmission gear part 19*a* is turned in the counterclockwise direction, the fan-shaped gear 24 is turned in the clockwise direction and the lock member 23 is moved from the retreated position 23B to the contact position 23A. In other words, when the power transmission gear part 19*a* is turned in the counterclockwise direction, the lock member 23 is turned in the counterclockwise direction with the fixed shaft 47 as a turning center. Further, when the power transmission gear part 19*a* is turned in the clockwise direction, the fan-shaped gear 24 is turned in the counterclockwise direction and the lock member 23 is moved from the contact position 23A to the retreated position 23B. In other words, when the power transmission gear part 19*a* is turned in the clockwise direction, the lock member 23 is turned in the clockwise direction with the fixed shaft 47 as a turning center.

The counterclockwise direction in this embodiment is a first turning direction which is a rotating direction of the rotation shaft 18, the gear 19 and the cam member 21 when the lock member 23 is moved from the retreated position 23B to the contact position 23A. The clockwise direction is a second turning direction which is a rotating direction of the rotation shaft 18, the gear 19 and the cam member 21 when the lock member 23 is moved from the contact position 23A to the retreated position 23B. A micro switch 51 is disposed to a rear side of the fan-shaped gear 24 for detecting whether the lock member 23 is located at the contact position 23A or the retreated position 23B by detecting a position of the fan-shaped gear 24.

As described above, the prevention part 45a is provided with the first prevention pawl 45b and the second prevention pawl 45c. The first prevention pawl 45b is inclined to a rear side toward a lower side when the lock member 23 is located at the contact position 23A. Specifically, the first prevention pawl 45b is protruded toward a lower rear side so that, when the lock member 23 is located at the contact position 23A, a tip end of the first prevention pawl 45b formed in a triangular shape is directed to a lower rear side. Further, the second prevention pawl 45c is inclined to a front side toward a lower side when the lock member 23 is located at the contact position 23A. Specifically, the second prevention pawl 45c is protruded toward a lower front side so that, when the lock member 23 is located at the contact position 23A, a tip end of the second prevention pawl 45c formed in a triangular shape is directed to a lower front side. Further, when the lock member 23 is located at the contact position 23A, the tip end of the first prevention pawl 45b and the tip end of the second prevention pawl 45c are disposed on a lower side with respect to the center of the card conveying passage 6 in the upper and lower direction.

Further, when the lock member 23 is located at the contact position 23A, as shown in FIG. 2, the tip end of the first prevention pawl 45b and the tip end of the second prevention pawl 45c are reached to lower ends of the lock member 23 and the tip end of the first prevention pawl 45b and the tip end of the second prevention pawl 45c are disposed on a lower side with respect to the center of the card conveying passage 6 in the upper and lower direction. Further, when the lock member 23 is located at the contact position 23A, the first prevention pawl 45b and the second prevention pawl 45c are disposed to a slightly rear side of the fixed shaft 47. Therefore, when the lock member 23 located at the contact position 23A starts to turn toward the retreated position 23B, the first prevention pawl 45b and the second prevention pawl 45c (in other words, prevention part 45a) are moved in a substantially rear direction.

A protruded part 45d whose shape when viewed in the right and left direction is substantially triangular is formed on a lower end side of the lock plate 45. A distance from the fixed shaft 47 to the protruded part 45d is set to be shorter than a distance from the fixed shaft 47 to the first prevention pawl 45b and a distance from the fixed shaft 47 to the second prevention pawl 45c. When the lock member 23 is located at the contact position 23A, the protruded part 45d is disposed to a front side and an upper side of the second prevention pawl 45c. Further, when the lock member 23 is located at the contact position 23A, a front end face 45e of the protruded part 45d is slightly inclined to a rear side toward an upper side with respect to the "Y-Z" plane structured of the right and left direction and the upper and lower direction. In addition, when the lock member 23 is located at the contact position 23A, the front end face 45e is disposed to a rear side of a lower end of the conveying roller 10 which is disposed on the most front side. Further, when the lock member 23 is located at the contact position 23A, in the upper and lower direction, the front end face 45e is disposed at substantially the same position as the center position in the upper and lower direction of the card conveying passage 6. The front end face 45e in this embodiment is an abutting face.

(Operation of Card Lock Mechanism)

Figure 11B:
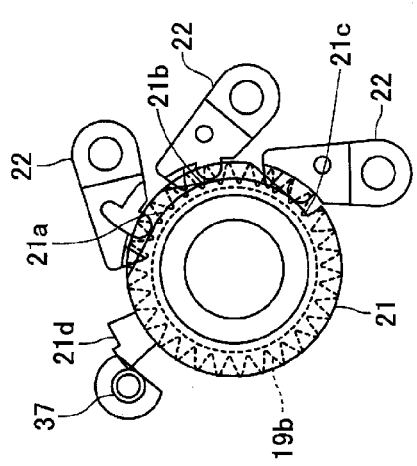
FIGS. 11(A) and 11(B) are explanatory views showing a state when a projecting part of the cam member is contacted with a stopper after the rotation shaft, the gear and the cam member are turned in the first turning direction from the state shown in FIGS. 10(A) and 10(B).
Figure 11A:
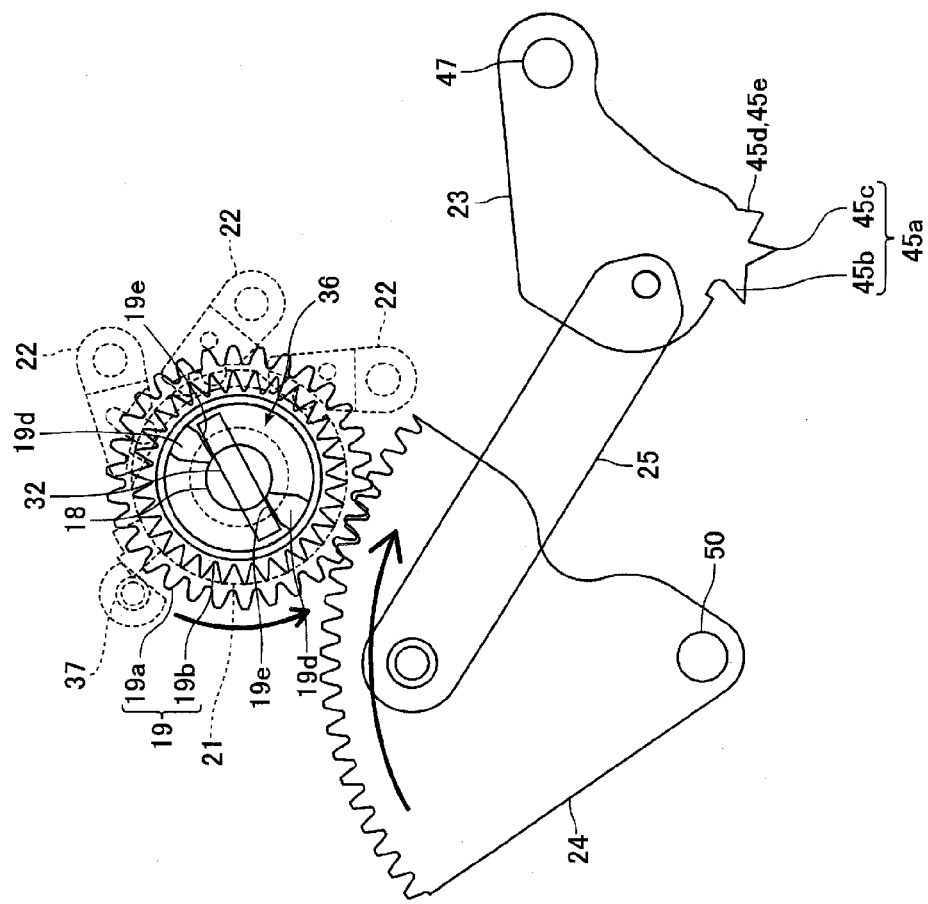

FIGS. 9(A) and 9(B) are explanatory views showing a state after the lock member 23 shown in FIG. 3 has been moved from the contact position 23A to the retreated position 23B. FIGS. 10(A) and 10(B) are explanatory views showing a state when the pin 32 is abutted with one end faces 19e of the engaging projections 19d after the rotation shaft 18 and the cam member 21 are turned in the counterclockwise direction from the state shown in FIGS. 9(A) and 9(B). FIGS. 11(A) and 11(B) are explanatory views showing a state when the projecting part 21d of the cam member 21 is contacted with the stopper 37 after the rotation shaft 18, the gear 19 and the cam member 21 are turned in the counterclockwise direction from the state shown in FIGS. 10(A) and 10(B). FIGS. 12(A) and 12(B) are explanatory views showing a state when the second prevention pawl 45c of the lock member 23 begins to contact with a card 2 after the rotation shaft 18 and the gear 19 are turned in the counterclockwise direction from the state shown in FIGS. 11(A) and 11(B). FIGS. 13(A) and 13(B) are explanatory views showing a state when the lock member 23 has reached to the contact position 23A after the rotation shaft 18 and the gear 19 are turned in the counterclockwise direction from the state shown in FIGS. 12(A) and 12(B). FIGS. 14(A) and 14(B) are explanatory views showing a state when the pin 32 is abutted with the other end faces 19f of the engaging projections 19d after the rotation shaft 18 and the cam member 21 are turned in the clockwise direction from the state shown in FIGS. 13(A) and 13(B). FIG. 15 is an explanatory view showing a state of a front end side of the card reader 1 when a card 2 is prevented from being drawn by the prevention part 45a shown in FIG. 3.

In the card lock mechanism 7 structured as described above, when the lock member 23 is located at the retreated position 23B, as shown in FIG. 9(B), engaging states of the ratchet gear part 19b with the ratchet members 22 are released. On the other hand, when the lock member 23 is located at the contact position 23A, as shown in FIG. 13(B), the ratchet gear part 19b and the ratchet members 22 are engaged with each other and thus turning of the gear 19 in the clockwise direction is prevented. Therefore, in this case, movement of the lock member 23 in a direction from the contact position 23A to the retreated position 23B is prevented. In this embodiment, a turning prevention mechanism for preventing turning of the lock member 23 when the lock member 23 is located at the contact position 23A is structured of the ratchet gear part 19b and the ratchet member 22.

Further, when movement of the lock member 23 from the contact position 23A to the retreated position 23B has finished, as shown in FIG. 9(A), the pin 32 is abutted with the other end faces 19f of the engagement projections 19d. In other words, when the lock member 23 is located at the retreated position 23B, the pin 32 is abutted with the other end faces 19f.

When the rotation shaft 18 begins to turn in the counterclockwise direction by power of the motor 15 from a state that the lock member 23 is located at the retreated position 23B, the cam member 21 begins to turn in the counterclockwise direction together with the rotation shaft 18. Further, when the rotation shaft 18 is turned by a predetermined amount and the pin 32 is abutted with the one end faces 19e of the engagement projections 19d as shown in FIG. 10(A), the gear 19 also begins to turn in the counterclockwise direction together with the rotation shaft 18. When the gear 19 begins to turn in the counterclockwise direction, the fan-shaped gear 24 begins to turn in the clockwise direction and the lock member 23 begins to move from the retreated position 23B to the contact position 23A. In this case, as shown in FIG. 10(B), engaging states of the ratchet gear part 19b and the ratchet members 22 have been released.

When the rotation shaft 18, the gear 19 and the cam member 21 are further turned in the counterclockwise direction and the projecting part 21d of the cam member 21 is contacted with the stopper 37 as shown in FIG. 11(B), transmission of power of the rotation shaft 18 to the cam member 21 is cut off and the cam member 21 is stopped. In this case, as shown in FIG. 11(B), the ratchet gear part 19b and the ratchet members 22 are engaged with each other. On the other hand, the gear 19 continues to turn in the counterclockwise direction together with the rotation shaft 18. In this embodiment, even when the ratchet gear part 19b and the ratchet members 22 are engaged with each other, turning of the gear 19 in the counterclockwise direction is permitted and thus, after the ratchet gear part 19b and the ratchet members 22 are engaged with each other, the gear 19 can continue to turn in the counterclockwise direction.

Further, when the rotation shaft 18 and the gear 19 are further turned in the counterclockwise direction, as shown in FIG. 12(A), the second prevention pawl 45c begins to contact with a card 2. Further, when the rotation shaft 18 and the gear 19 are further turned in the counterclockwise direction and the lock member 23 is reached to the contact position 23A as shown in FIG. 13(A), the motor 15 is stopped and the rotation shaft 18 and the gear 19 are stopped. In this case, as shown in FIG. 13(A), the pin 32 is abutted with the one end faces 19e. In other words, when the lock member 23 is located at the contact position 23A, the pin 32 is abutted with the one end faces 19e.

Further, the rotation shaft 18 begins to turn in the clockwise direction by power of the motor 15 from the state that the lock member 23 is located at the contact position 23A, the cam member 21 begins to turn in the clockwise direction together with the rotation shaft 18. Further, when the rotation shaft 18 is turned by a predetermined amount, as shown in FIG. 14(A), the pin 32 is abutted with the other end faces 19f. In this case, as shown in FIG. 14(B), the engaging states of the ratchet gear part 19b with the ratchet members 22 are released. In other words, when the rotation shaft 18 is turned in the clockwise direction by power of the motor 15 from the state that the lock member 23 is located at the contact position 23A, the engaging states of the ratchet gear part 19b with the ratchet members 22 are released before the pin 32 abutted with the one end faces 19e are moved and abutted with the other end faces 19f and the gear 19 begins to turn in the clockwise direction.

Therefore, when the pin 32 is abutted with the other end faces 19f, the gear 19 begins to turn in the clockwise direction together with the rotation shaft 18. When the gear 19 begins to turn in the clockwise direction, the fan-shaped gear 24 begins to turn in the counterclockwise direction and the lock member 23 begins to move from the contact position 23A to the retreated position 23B. After that, the rotation shaft 18, the gear 19 and the cam member 21 are turned in the clockwise direction until the lock member 23 is reached to the retreated position 23B and, when the lock member 23 is reached to the retreated position 23B, the motor 15 is stopped and the rotation shaft 18, the gear 19 and the cam member 21 are stopped.

As described above, the pad roller 11 is capable of moving in the upper and lower direction and, when the lock member 23 is located at the contact position 23A, a tip end of the first prevention pawl 45b and a tip end of the second prevention pawl 45c are disposed on a lower side with respect to the center of the card conveying passage 6 in the upper and lower direction. Therefore, when the lock member 23 is located at the contact position 23A (in other words, when the first prevention pawl 45b and the second prevention pawl 45c are contacted with a card 2), as shown in FIG. 15, a portion of the card 2 disposed in an inside of the main body part 5 is pressed by the prevention part 45a from an upper side and the pad roller 11 is moved to a lower side and thereby the portion of the card 2 disposed in the inside of the main body part 5 is deformed in the lower direction. Further, as described above, the front end face 45e of the protruded part 45d of the lock plate 45 is disposed at substantially the same position as the center position in the upper and lower direction of the card conveying passage 6 when the lock member 23 is located at the contact position 23A. Therefore, for example, as shown in FIG. 15, even when a criminal uses a foreign matter to apply a force 60 for pressing the lock member 23 to a rear side, the foreign matter and the force 60 by the foreign matter are prevented by the front end face 45e.

Principal Effects in this Embodiment

As described above, in this embodiment, when the lock member 23 is located at the contact position 23A, the ratchet gear part 19b and the ratchet members 22 are engaged with each other and thus turning of the gear 19 in the clockwise direction is prevented and movement of the lock member 23 in a direction from the contact position 23A to the retreated position 23B is prevented. Therefore, according to this embodiment, even when a criminal applies a force 60 by using a foreign matter from the card insertion port 3 side for trying to move the lock member 23 in a direction from the contact position 23A to the retreated position 23B, the ratchet gear part 19b and the ratchet members 22 are engaged with each other and thus the prevention part 45a is prevented from being moved. Accordingly, in this embodiment, even when a criminal tries to draw out a card 2 with which the prevention part 45a is contacted from the card insertion port 3, the card 2 is prevented from being drawn from the card insertion port 3 by an operation of the prevention part 45a. As a result, according to this embodiment, the phishing can be prevented surely.

In this embodiment, when the rotation shaft 18 is turned in the counterclockwise direction from a state that the lock member 23 is located at the retreated position 23B, the torsion coil spring 38 transmits power of the rotation shaft 18 to the cam member 21 before the projecting part 21d is contacted with the stopper 37 and, when the projecting part 21d is contacted with the stopper 37, transmission of power of the rotation shaft 18 to the cam member 21 is cut off. Further, when the rotation shaft 18 is turned in the clockwise direction from a state that the lock member 23 is located at the contact position 23A, the torsion coil spring 38 transmits power of the rotation shaft 18 to the cam member 21. Further, in this embodiment, when the rotation shaft 18 is turned in the counterclockwise direction from a state that the lock member 23 is located at the retreated position 23B and then the projecting part 21d is contacted with the stopper 37 and the cam member 21 is stopped, the ratchet gear part 19b and the ratchet members 22 are engaged with each other. In addition, in this embodiment, when the rotation shaft 18 is turned in the counterclockwise direction and the pin 32 is abutted with the one end faces 19e, the pin clutch 36 transmits power of the rotation shaft 18 turned in the counterclockwise direction to the gear 19. Further, when the rotation shaft 18 is turned in the clockwise direction and the pin 32 is abutted with the other end faces 19*f*, the pin clutch 36 transmits power of the rotation shaft 18 turned in the clockwise direction to the gear 19. In addition, when the rotation shaft 18 is turned so that the pin 32 is moved between the one end faces 19*e* and the other end faces 19*f* in the circumferential direction, the pin clutch 36 cuts off transmission of power of the rotation shaft 18 to the gear 19. Further, in this embodiment, when the rotation shaft 18 is turned in the clockwise direction from a state that the lock member 23 is located at the contact position 23A, engaging states of the ratchet gear part 19*b* with the ratchet members 22 are released before the pin 32 abutted with the one end faces 19*e* are turned and abutted with the other end faces 19*f* to turn the gear 19 in the clockwise direction.

Therefore, according to this embodiment, even when a drive source for driving the ratchet members 22 is not provided separately, the ratchet gear part 19*b* and the ratchet members 22 can be engaged with each other before movement of the lock member 23 from the retreated position 23B to the contact position 23A is completed. Further, when the lock member 23 is to be moved from the contact position 23A to the retreated position 23B, the engaging states of the ratchet gear part 19*b* with the ratchet members 22 can be released before the gear 19 begins to turn in the clockwise direction. Therefore, according to this embodiment, the phishing can be prevented surely with a relatively simple structure. Further, in this embodiment, when the projecting part 21*d* is contacted with the stopper 37, transmission of power of the rotation shaft 18 to the cam member 21 is cut off and the cam member 21 is stopped. Therefore, when the lock member 23 is to be moved from the contact position 23A to the retreated position 23B, the engaging states of the ratchet gear part 19*b* with the ratchet members 22 can be released at a relatively short time after the motor 15 is activated and the cam member 21 is started to turn together with the rotation shaft 18. Accordingly, in this embodiment, when the lock member 23 is to be moved from the contact position 23A to the retreated position 23B, the engaging states of the ratchet gear part 19*b* with the ratchet members 22 can be surely released before the gear 19 begins to turn in the counterclockwise direction.

In this embodiment, the phase of the three ratchet members 22 and the phase of the ratchet teeth formed on the outer peripheral face of the ratchet gear part 19*b* are displaced from each other. Therefore, according to this embodiment, in comparison with a case that the phase of the three ratchet members 22 and the phase of the ratchet teeth formed on the outer peripheral face of the ratchet gear part 19*b* are coincided with each other, a backlash between the three ratchet members 22 and the ratchet gear part 19*b* can be reduced. Accordingly, in this embodiment, rattling of the lock member 23 located at the contact position 23A can be restrained.

Further, in this embodiment, the lock member 23 is provided with the first prevention pawl 45*b* inclined to a rear side toward a lower side and the second prevention pawl 45*c* inclined to a front side toward the lower side when the lock member 23 is located at the contact position 23A. Therefore, even when the lock member 23 pushed by a foreign matter inserted from the card insertion port 3 is moved to a rear side, the second prevention pawl 45*c* sticks into a card 2. Accordingly, in this embodiment, drawing of a card 2 from the card insertion port 3 after the lock member 23 is pushed to a rear side can be prevented. Further, when a criminal tries to pull a card 2 to a front side in a state that the prevention part 45*a* is contacted with the card 2, the first prevention pawl 45*b* sticks into the card 2 and thus, also in this case, drawing of the card 2 from the card insertion port 3 can be prevented. Therefore, according to this embodiment, the phishing can be surely prevented with a relatively simple structure which is provided with the first prevention pawl 45*b* and the second prevention pawl 45*c*.

In this embodiment, the front end face 45*e* of the protruded part 45*d* of the lock plate 45 is disposed at substantially the same position as the center position in the upper and lower direction of the card conveying passage 6 when the lock member 23 is located at the contact position 23A. Therefore, as described above, for example, even when a criminal inserts a foreign matter from the card insertion port 3 side and applies a force 60 through the foreign matter for moving the lock member 23 to a rear side, the force 60 is prevented by the front end face 45*e*. Further, in this embodiment, a distance from the fixed shaft 47 to the protruded part 45*d* is set to be shorter than a distance from the fixed shaft 47 to the second prevention pawl 45*c*. Therefore, in comparison with a case that a moment acted on the lock member 23 with the fixed shaft 47 as a center by a force 60 through a foreign matter is applied to the second prevention pawl 45*c*, a moment acted on the lock member 23 with the fixed shaft 47 as a center can be reduced when the force 60 by the foreign matter is applied to the front end face 45*e*. Accordingly, in this embodiment, even when a criminal inserts a foreign matter from the card insertion port 3 side and applies a force 60 through the foreign matter, the lock member 23 located at the contact position 23A is hard to be turned toward the retreated position 23B.

Modified Embodiment of Card Lock Mechanism

Figure 16:
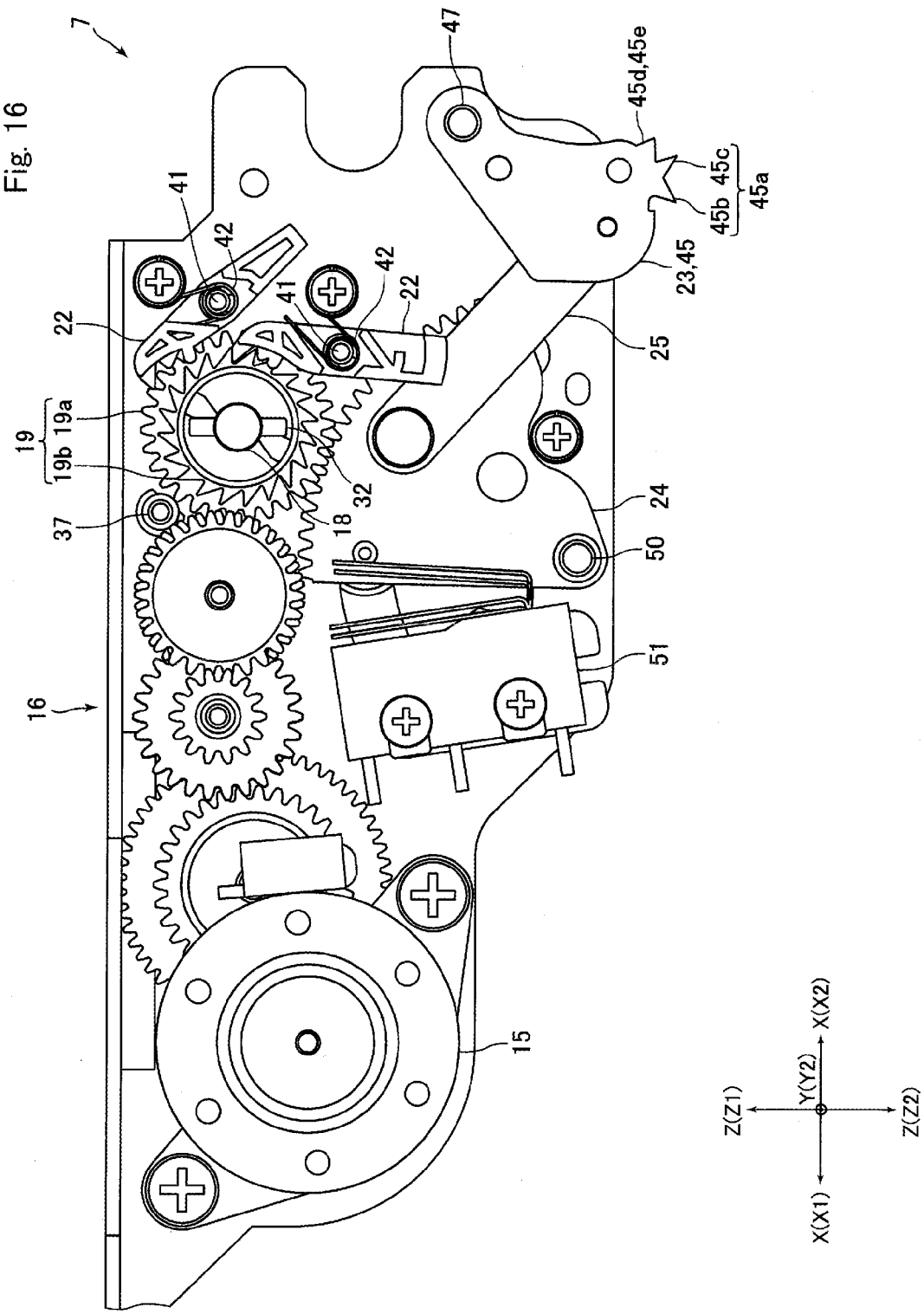
FIG. 16 is a side view showing a card lock mechanism in accordance with another embodiment of the present invention.

FIG. 16 is a side view showing a card lock mechanism 7 in accordance with another embodiment of the present invention. FIG. 17 is a perspective view showing a gear 19 and ratchet members 22 shown in FIG. 16. FIG. 18 is an explanatory view showing a structure of a ratchet gear part 19*b* and the ratchet member 22 shown in FIG. 17.

A feature in a modified embodiment of a card lock mechanism 7 shown in FIGS. 16 through 18 is a structure of a ratchet gear part 19*b* and a ratchet member 22. Therefore, in the following descriptions, a structure of the card lock mechanism 7 in accordance with a modified embodiment will be described mainly on a structure of the ratchet gear part 19*b* and a structure of the ratchet member 22. In FIGS. 16 through 18, the same reference signs are used for the same structures as those in the above-mentioned embodiment. Further, in FIG. 16, the final gear 17, the cam member 21 and the like are not shown.

A ratchet gear part 19*b* is formed of metal material. In other words, a gear 19 is formed of metal material. Similarly to the embodiment described above, an outer peripheral face of the ratchet gear part 19*b* is formed with a plurality of ratchet teeth 19*g* at an equal angular pitch with respect to a rotation center of the ratchet gear part 19*b*. The ratchet teeth 19*g* are formed so that, when the ratchet gear part 19*b* and the ratchet members 22 are engaged with each other, turning of the gear 19 in the clockwise direction is prevented and turning of the gear 19 in the counterclockwise direction is permitted.

Specifically, the ratchet tooth 19*g* is formed in a substantially spiral shape which is inclined in the clockwise direction toward an outer side with respect to a rotation center of the ratchet gear part 19*b*. In other words, when viewed in the right and left direction, an inclination angle of a face 19*h* on a counterclockwise direction side of the ratchet tooth 19*g*

(counterclockwise direction side face) with respect to a tangential direction for a tooth tip circle of the ratchet gear part 19*b* is set to be gradual (smaller) in comparison with an inclination angle of a face 19*j* on a clockwise direction side of the ratchet tooth 19*g* (clockwise direction side face) with respect to the tangential direction for the tooth tip circle of the ratchet gear part 19*b*. Further, the counterclockwise direction side face 19*h* is formed in a convex curved surface shape and the clockwise direction side face 19*j* is formed in a concave curved surface shape. The clockwise direction side face 19*j* is formed as a contact face capable of contacting with engaging parts 22*c* and 22*d* described below which are formed in the ratchet member 22.

The card lock mechanism 7 in accordance with the modified embodiment includes two ratchet members 22 and the cam member 21 is formed with two cam faces. Similarly to the embodiment described above, the ratchet member 22 is turnably held by a holding shaft 41. Axial centers of the two holding shafts 41 are disposed on a virtual circle with a rotation center of the ratchet gear part 19*b* as a center.

The ratchet member 22 is formed of resin material. The ratchet member 22 is provided with two engaging parts 22*c* and 22*d* capable of engaging with the ratchet teeth 19*g*. Further, the ratchet member 22 is, as shown in FIG. 17, formed in a substantially straight bar shape comprised of a shaft insertion part 22*e* into which the holding shaft 41 is inserted, a ratchet part 22*f* extending from the shaft insertion part 22*e* in one of a direction perpendicular to the right and left direction, and a counterbalance part 22*g* extending from the shaft insertion part 22*e* in an opposite direction to the direction where the ratchet part 22*f* is extended. The engaging parts 22*c* and 22*d* are formed on a tip end side of the ratchet part 22*f*. A distance from the holding shaft 41 to a tip end of the ratchet part 22*f* and a distance from the holding shaft 41 to a tip end of the counterbalance part 22*g* are set to be substantially equal to each other. Further, the ratchet member 22 is formed with a cam follower 22*h* contacting with a cam face of the cam member 21.

Similarly to the embodiment described above, the ratchet member 22 is urged by a torsion coil spring 42 in a counterclockwise direction with the holding shaft 41 as a center. The cam follower 22*h* is contacted with the cam face of the cam member 21 by an urging force of the torsion coil spring 42. Further, the torsion coil spring 42 urges the ratchet member 22 in a direction that the ratchet teeth 19*g* and the engaging part 22*c* are engaged with each other.

Further, similarly to the embodiment described above, an angle between the axial centers of the two holding shafts 41 with respect to the rotation center of the ratchet gear part 19*b* is set to be larger than an angle between ratchet teeth 19*g* with respect to the rotation center of the ratchet gear part 19*b* and, in addition, the angle between the axial centers of the holding shafts 41 is set to be a value other than integer multiples of the angle between the ratchet teeth 19*g* with respect to the rotation center of the ratchet gear part 19*b*. Therefore, in this embodiment, in a case that one ratchet member 22 and the ratchet gear part 19*b* are completely engaged with each other, the other ratchet member 22 and the ratchet gear part 19*b* are not completely engaged with each other.

The engaging parts 22*c* and 22*d* are formed in a pawl shape which is protruded to one side in the direction perpendicular to a longitudinal direction of the ratchet member 22 formed in a substantially straight bar shape. A protruding amount of the engaging part 22*c* is larger than a protruding amount of the engaging part 22*d*. The engaging part 22*c* is disposed on a tip end side of the ratchet part 22*f* relative to the engaging part 22*d*. When the ratchet gear part 19*b* and the ratchet member 22 are engaged with each other, normally, the engaging part 22*c* and the ratchet tooth 19*g* are engaged with each other and turning of the gear 19 in the clockwise direction is prevented by the engaging part 22*c* and the ratchet tooth 19*g*. In this embodiment, even when the engaging part 22*c* and the ratchet tooth 19*g* are engaged with each other, turning of the gear 19 in the counterclockwise direction is permitted.

On the other hand, when the ratchet gear part 19*b* and the ratchet member 22 are engaged with each other, the engaging part 22*d* is not normally engaged with the ratchet tooth 19*g*. The engaging part 22*d* is structured so that, in a case that the engaging part 22*c* and the ratchet tooth 19*g* are engaged with each other, when a turning force in the clockwise direction is acted on the gear 19 and the engaging part 22*c* of the ratchet member 22 made of resin is resiliently bent, the engaging part 22*d* is engaged with a ratchet tooth 19*g* which is adjacent in the clockwise direction to the ratchet tooth 19*g* engaged with the engaging part 22*c*. In this modified embodiment, the engaging part 22*c* is a first engaging part and the engaging part 22*d* is a second engaging part.

When the engaging part 22*c* and the ratchet tooth 19*g* are engaged with each other, the clockwise direction side face 19*j* of the ratchet tooth 19*g* and a face (counterclockwise direction side face) 22*k* on the counterclockwise direction side of the engaging part 22*c* are contacted with each other. In other words, the counterclockwise direction side face 22*k* is a contact face which is contacted with the ratchet tooth 19*g*. The counterclockwise direction side face 22*k* is formed in a convex curved surface shape. Further, a curvature of the clockwise direction side face 19*j* which is a contact face of the ratchet tooth 19*g* with the engaging part 22*c* and a curvature of the counterclockwise direction side face 22*k* which is a contact face of the engaging part 22*c* with the ratchet tooth 19*g* are set to be substantially equal to each other. In other words, the clockwise direction side face 19*j* and the counterclockwise direction side face 22*k* are formed in curved face shapes having substantially the same curvature.

In the modified embodiment of the card lock mechanism 7 shown in FIGS. 16 through 18, the ratchet gear part 19*b* formed of metal material and the ratchet member 22 formed of resin material are engaged with each other. Therefore, in comparison with a case that the ratchet member 22 is formed of metal material, damage of the ratchet gear part 19*b* can be prevented when the ratchet gear part 19*b* and the ratchet member 22 are engaged with each other. Further, since the ratchet member 22 is formed of resin material, cost of the ratchet member 22 can be reduced.

Further, in this modified embodiment, in a case that the engaging part 22*c* and the ratchet tooth 19*g* are engaged with each other, when a turning force in the clockwise direction is acted on the gear 19 and the engaging part 22*c* is resiliently bent, the engaging part 22*d* is engaged with the ratchet tooth 19*g* which is adjacent in the clockwise direction to the ratchet tooth 19*g* engaged with the engaging part 22*c*. Therefore, even when the lock member 23 is pushed from the contact position 23A in a direction to the retreated position 23B, a turning force in the clockwise direction is acted on the gear 19, and the engaging part 22*c* is resiliently bent, an engaging state of the ratchet gear part 19*b* and the ratchet member 22 can be maintained by the engaging part 22*c* and the engaging part 22*d*.

Further, in this modified embodiment, a curvature of the clockwise direction side face 19*j* which is a contact face of the ratchet tooth 19g with the engaging part 22c and a curvature of the counterclockwise direction side face 22k which is a contact face of the engaging part 22c with the ratchet tooth 19g are substantially equal to each other and thus a contact area of the ratchet tooth 19g and the engaging part 22c can be made wide and increased. Therefore, even when an impact is applied to the card reader 1 in a case that the ratchet tooth 19g and the engaging part 22c are engaged with each other, the engaging state of the ratchet tooth 19g and the engaging part 22c is hard to be released.

In addition, in this modified embodiment, the ratchet member 22 is provided with the counterbalance part 22g extending from the shaft insertion part 22e in an opposite direction to the direction where the ratchet part 22f is extended. Therefore, a moment with the holding shaft 41 as a center is hard to be generated in the ratchet member 22 by an operation of the counterbalance part 22g. Accordingly, even when an impact is applied to the card reader 1 in a case that the ratchet tooth 19g and the engaging part 22c are engaged with each other, the ratchet member 22 is hard to be turned with the holding shaft 41 as a center and, as a result, an engaging state of the ratchet tooth 19g and the engaging part 22c is hard to be released.

In this modified embodiment, the ratchet member 22 may be provided with no engaging part 22d and may be provided with no counterbalance part 22g. Further, in this modified embodiment, the ratchet member 22 may be formed of metal material. In addition, in this modified embodiment, a curvature of the clockwise direction side face 19j and a curvature of the counterclockwise direction side face 22k may be different from each other. Alternatively, the clockwise direction side face 19j and the counterclockwise direction side face 22k may be formed in flat face shapes.

Other Embodiments

Although the present invention has been shown and described with reference to a specific embodiment, various changes and modifications will be apparent to those skilled in the art from the teachings herein.

In the embodiment described above, the phase of the three ratchet members 22 and the phase of the ratchet teeth formed on the outer peripheral face of the ratchet gear part 19b are displaced from each other. However, the present invention is not limited to this embodiment. For example, the phase of the three ratchet members 22 and the phase of the ratchet teeth may be coincided with each other. In other words, an angle between the axial centers of the holding shafts 41 with respect to the rotation center of the ratchet gear part 19b may be set to be a value of integer multiples of an angle between the ratchet teeth with respect to the rotation center of the ratchet gear part 19b. Further, in the embodiment described above, the card lock mechanism 7 includes three ratchet members 22 but, like the modified embodiment shown in FIGS. 16 through 18, the card lock mechanism 7 may include two ratchet members 22. Alternatively, the card lock mechanism 7 may include one ratchet member 22 or may include four or more ratchet members 22.

In the embodiment described above, the pin 32 is fixed to the rotation shaft 18 and the engagement projections 19d are formed on the gear 19. However, the present invention is not limited to this embodiment. For example, it may be structured that a pin corresponding to the pin 32 is fixed to or formed on the gear 19 and an engaging projection corresponding to the engagement projection 19d is fixed to or formed on the rotation shaft 18. Further, in the embodiment described above, a torque limiter disposed between the rotation shaft 18 and the cam member 21 in a direction for transmitting power from the motor 15 is structured by using the torsion coil spring 38. However, a torque limiter other than the torsion coil spring 38 but acting similarly to the torsion coil spring 38 may be disposed between the rotation shaft 18 and the cam member 21 in a direction for transmitting power from the motor 15.

In the embodiment described above, the prevention part 45a is structured of the first prevention pawl 45b and the second prevention pawl 45c. However, the prevention part 45a may be structured of only the first prevention pawl 45b. Further, in the embodiment described above, the protruded part 45d is formed in the lock plate 45 but no protruded part 45d may be formed in the lock plate 45. Further, in the embodiment described above, the sleeve 34 is disposed to an outer peripheral side of the rotation shaft 18 but no sleeve 34 may be disposed to an outer peripheral side of the rotation shaft 18.

In the embodiment described above, the lock member 23 is turnably held by the fixed shaft 47 which is fixed to the frame of the card lock mechanism 7. However, the present invention is not limited to this embodiment. For example, the lock member 23 may be fixed to a turnable shaft which is turnably held by the frame of the card lock mechanism 7. In other words, the card lock mechanism 7 may include a turnable shaft which turns together with the lock member 23 instead of the fixed shaft 47.

In the embodiment described above, the card lock mechanism 7 includes the ratchet gear part 19b and the ratchet members 22. However, the card lock mechanism 7 may include no ratchet gear part 19b and no ratchet member 22. Also in this case, when the lock member 23 is moved to a rear side through a foreign matter inserted from the card insertion port 3 by a criminal, the second prevention pawl 45c sticks into a card 2. Further, when a criminal draws a card 2 to a front side in a state that the prevention part 45a is contacted, the first prevention pawl 45b sticks into the card 2. Therefore, the phishing can be prevented surely. In this case, the cam member 21, the pin clutch 36 and the torsion coil spring 38 are not required.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
   a card insertion port into which the card is inserted and from which the card is ejected;
   a card conveying passage where the card inserted from the card insertion port is conveyed; and
   a card lock mechanism structured to prevent drawing of the card from the card insertion port when the card is abnormally stopped in the card conveying passage and the card is clogged in the card conveying passage;
   wherein the card lock mechanism comprises:
      a motor;
      a rotation shaft which is rotated by power of the motor;

a gear which is relatively turnably held by the rotation shaft and is provided with a power transmission gear part for power transmission and a ratchet gear part integrally turning with the power transmission gear part;
a clutch mechanism which is disposed between the rotation shaft and the gear in a transmission direction of the power of the motor;
a ratchet member structured to engage with the ratchet gear part to prevent turning of the gear;
a cam member which is relatively turnably held by the rotation shaft and is formed with a cam face with which a cam follower formed on the ratchet member is contacted for moving the ratchet member between a position where the ratchet gear part and the ratchet member are engaged with each other and a position where an engaging state of the ratchet gear part with the ratchet member is released;
a torque limiter which is disposed between the rotation shaft and the cam member in the transmission direction of the power of the motor;
an urging member which urges the ratchet member in a direction where the cam follower is contacted with the cam face;
a stopper for restricting a turnable range of the cam member; and
a lock member which is formed with a prevention part structured to contact with the card for preventing drawing of the card and is movable by power transmitted from the power transmission gear part between a contact position where the prevention part is contacted with the card and a retreated position where the prevention part is retreated from the card conveying passage;
wherein in a case that a turning direction of the rotation shaft, the gear and the cam member when the lock member is moved from the retreated position toward the contact position is a first turning direction, and a turning direction of the rotation shaft, the gear and the cam member when and the lock member is moved from the contact position toward the retreated position is a second turning direction, when the cam member is turned in the first turning direction from a state that the lock member is located at the retreated position, the cam member is contacted with the stopper to restrict the turnable range of the cam member;
wherein when the rotation shaft is turned in the first turning direction by the power of the motor from the state that the lock member is located at the retreated position, the torque limiter transmits power of the rotation shaft to the cam member until the cam member is contacted with the stopper and, when the cam member is contacted with the stopper, the torque limiter cuts off transmission of the power of the rotation shaft to the cam member and, when the rotation shaft is turned in the second turning direction by the power of the motor from the state that the lock member is located at the contact position, the torque limiter transmits the power of the rotation shaft to the cam member;
wherein the clutch mechanism is a pin clutch comprising:
a pin which is fixed to or formed on one of the rotation shaft and the gear with a radial direction of the rotation shaft and the gear as an axial direction; and
an engaging projection which is fixed to or formed on the other of the rotation shaft and the gear so that the pin is capable of engaging with both ends of the engaging projection in a circumferential direction of the rotation shaft and the gear;
wherein the clutch mechanism is structured such that:
when the rotation shaft is turned in the first turning direction by the power of the motor and the pin is abutted with one end of the engaging projection in the circumferential direction, the power of the rotation shaft turning in the first turning direction is transmitted to the gear;
when the rotation shaft is turned in the second turning direction by the power of the motor and the pin is abutted with the other end of the engaging projection in the circumferential direction, the power of the rotation shaft turning in the second turning direction is transmitted to the gear;
when the rotation shaft is turned by the power of the motor so that the pin is moved between the one end of the engaging projection and the other end of the engaging projection in the circumferential direction, transmission of the power of the rotation shaft to the gear is cut off;
wherein when the ratchet gear part and the ratchet member are engaged with each other, turning of the gear in the second turning direction is prevented and movement of the lock member from the contact position toward the retreated position is prevented;
wherein when the lock member is located at the retreated position, an engaging state of the ratchet gear part with the ratchet member is released and, when the lock member is located at the contact position, the ratchet gear part and the ratchet member are engaged with each other;
wherein when the rotation shaft is turned in the first turning direction from a state that the lock member is located at the retreated position and the cam member is contacted with the stopper and thereby the cam member is stopped, the ratchet gear part and the ratchet member are engaged with each other; and
wherein when the rotation shaft is turned in the second turning direction from a state that the lock member is located at the contact position, the engaging state of the ratchet gear part with the ratchet member is released before the pin abutted with the one end of the engaging projection in the circumferential direction is moved and abutted with the other end of the engaging projection in the circumferential direction and the gear begins to turn in the second turning direction.

2. The card reader according to claim 1, wherein the rotation shaft, the cam member and the gear are coaxially disposed with each other.

3. The card reader according to claim 2, wherein
the torque limiter comprises a torsion coil spring,
the rotation shaft is inserted to an inner peripheral side of the torsion coil spring, and
one end of the torsion coil spring is engaged with an inner peripheral side of the cam member.

4. The card reader according to claim 3, wherein
the card lock mechanism comprises:
a plurality of the ratchet members; and
a plurality of holding shafts which respectively turnably hold the plurality of the ratchet members;
a plurality of ratchet teeth is formed on an outer peripheral face of the ratchet gear part at an equal angular pitch with respect to a rotation center of the ratchet gear part,
axial centers of the plurality of the holding shafts are disposed on a virtual circle with the rotation center of the ratchet gear part as a center and are disposed at an equal angular pitch with respect to the rotation center of the ratchet gear part, and an angle between the axial centers of the holding shafts with respect to the rotation center of the ratchet gear part is set to be larger than an angle between the ratchet teeth with respect to the rotation center of the ratchet gear part and is set to be a value other than integer multiples of the angle between the ratchet teeth with respect to the rotation center of the ratchet gear part.

5. The card reader according to claim 3, wherein
the ratchet gear part is formed of metal material,
the ratchet member is formed of resin material,
a plurality of ratchet teeth is formed on an outer peripheral face of the ratchet gear part,
the ratchet member is provided with a plurality of engaging parts engagable with the ratchet teeth, and
the plurality of the engaging parts comprises:
   a first engaging part which is engaged with the ratchet tooth when the ratchet gear part and the ratchet member are engaged with each other; and
   a second engaging part which is engaged with the ratchet tooth when a turning force in the second turning direction acts on the gear and the first engaging part is resiliently bent in a state that the ratchet tooth and the first engaging part are engaged with each other.

6. The card reader according to claim 3, wherein
a plurality of ratchet teeth is formed on an outer peripheral face of the ratchet gear part,
the ratchet member is provided with a first engaging part which is capable of contacting with the ratchet tooth and being engaged with the ratchet tooth, and
a contact face of the ratchet tooth with the first engaging part and a contact face of the first engaging part with the ratchet tooth are formed in curved faces whose curvatures are substantially equal to each other.

7. The card reader according to claim 3, wherein
the card lock mechanism comprises a holding shaft which turnably holds the ratchet member,
a plurality of ratchet teeth is formed on an outer peripheral face of the ratchet gear part, and
the ratchet member comprises:
   a shaft insertion part into which the holding shaft is inserted;
   a ratchet part which is formed with a first engaging part engagable with the ratchet tooth on its tip end side and is extended from the shaft insertion part to one side in a direction perpendicular to an axial direction of the holding shaft; and
   a counterbalance part which is extended from the shaft insertion part in an opposite direction to the ratchet part.

8. A card reader for use with a card, the card reader comprising:
   a card insertion port into which a card is inserted and from which the card is ejected;
   a card conveying passage where the card inserted from the card insertion port is conveyed; and
   a card lock mechanism structured to prevent drawing of the card from the card insertion port when the card is abnormally stopped in the card conveying passage and the card is clogged in the card conveying passage;
   wherein in a case that an inserting direction of the card is referred to as a first direction, an ejecting direction of the card is referred to as a second direction, one side in a thickness direction of the card conveyed along the card conveying passage is referred to as a third direction, the other side in the thickness direction of the card is referred to as a fourth direction, and a direction perpendicular to the first direction and the third direction is referred to as a fifth direction,
   the card lock mechanism comprises:
      a lock member formed with a prevention part structured to contact with the card for preventing drawing of the card; and
      a fixed shaft which turnably holds the lock member or a turnable shaft which turns together with the lock member;
   wherein the lock member is disposed on a third direction side relative to the card conveying passage;
   wherein the fixed shaft or the turnable shaft is disposed so that its axial direction is coincided with the fifth direction and is disposed on the third direction side and a second direction side relative to the prevention part;
   wherein the lock member is turnable between a contact position where the prevention part is contacted with the card and a retreated position where the prevention part is retreated from the card conveying passage with the fixed shaft or the turnable shaft as a turning center;
   wherein when the lock member located at the contact position begins to turn toward the retreated position, the prevention part is moved in substantially the first direction; and
   wherein when the lock member is located at the contact position, the prevention part comprises:
      a first prevention part which is inclined to a first direction side toward a fourth direction side; and
      a second prevention part which is disposed on a second direction side relative to the first prevention part and is inclined to the second direction side toward the fourth direction side.

9. The card reader according to claim 8, further comprising:
   a conveying roller structured to abut with the card and convey the card; and
   a pad roller which is oppositely disposed to the conveying roller in the thickness direction of the card and is urged toward the conveying roller;
   wherein the conveying roller is disposed so as to face the card conveying passage from the third direction side;
   wherein the pad roller is disposed so as to face the card conveying passage from the fourth direction side;
   wherein a fourth direction end of the conveying roller and a center position of the card conveying passage in the thickness direction of the card are substantially coincided with each other in the thickness direction of the card;
   wherein the pad roller is moved in the fourth direction when the second prevention part is contacted with the card;
   wherein when the lock member is located at the contact position, a fourth direction end of the first prevention part and a fourth direction end of the second prevention part are disposed on the fourth direction side relative to the center position of the card conveying passage in the thickness direction of the card;
   wherein the lock member is formed with an abutting face which is disposed on the second direction side and the third direction side relative to the second prevention part and is disposed at substantially the same position as the center position of the card conveying passage in the thickness direction of the card when the lock member is located at the contact position; and wherein a distance from the fixed shaft or the turnable shaft to the abutting face is set to be shorter than a distance from the fixed shaft or the turnable shaft to the second prevention part.

10. The card reader according to claim 8, wherein the first prevention part and the second prevention part are formed in a triangular shape whose width becomes narrower toward its tip end side when viewed in the fifth direction.

11. The card reader according to claim 8, further comprising a turning prevention mechanism structured to prevent turning of the lock member when the lock member is located at the contact position.

12. The card reader according to claim 1, wherein
the card lock mechanism comprises:
 a plurality of the ratchet members; and
 a plurality of holding shafts which respectively turnably hold the plurality of the ratchet members;
a plurality of ratchet teeth is formed on an outer peripheral face of the ratchet gear part at an equal angular pitch with respect to a rotation center of the ratchet gear part,
axial centers of the plurality of the holding shafts are disposed on a virtual circle with the rotation center of the ratchet gear part as a center and are disposed at an equal angular pitch with respect to the rotation center of the ratchet gear part, and
an angle between the axial centers of the holding shafts with respect to the rotation center of the ratchet gear part is set to be larger than an angle between the ratchet teeth with respect to the rotation center of the ratchet gear part and is set to be a value other than integer multiples of the angle between the ratchet teeth with respect to the rotation center of the ratchet gear part.

13. The card reader according to claim 1, wherein
the ratchet gear part is formed of metal material,
the ratchet member is formed of resin material,
a plurality of ratchet teeth is formed on an outer peripheral face of the ratchet gear part,
the ratchet member is provided with a plurality of engaging parts engagable with the ratchet teeth, and
the plurality of the engaging parts comprises:
 a first engaging part which is engaged with the ratchet tooth when the ratchet gear part and the ratchet member are engaged with each other; and
 a second engaging part which is engaged with the ratchet tooth when a turning force in the second turning direction acts on the gear and the first engaging part is resiliently bent in a state that the ratchet tooth and the first engaging part are engaged with each other.

14. The card reader according to claim 1, wherein
a plurality of ratchet teeth is formed on an outer peripheral face of the ratchet gear part,
the ratchet member is provided with a first engaging part which is capable of contacting with the ratchet tooth and being engaged with the ratchet tooth, and
a contact face of the ratchet tooth with the first engaging part and a contact face of the first engaging part with the ratchet tooth are formed in curved faces whose curvatures are substantially equal to each other.

15. The card reader according to claim 1, wherein
the card lock mechanism comprises a holding shaft which turnably holds the ratchet member,
a plurality of ratchet teeth is formed on an outer peripheral face of the ratchet gear part, and
the ratchet member comprises:
 a shaft insertion part into which the holding shaft is inserted;
 a ratchet part which is formed with a first engaging part engagable with the ratchet tooth on its tip end side and is extended from the shaft insertion part to one side in a direction perpendicular to an axial direction of the holding shaft; and
 a counterbalance part which is extended from the shaft insertion part in an opposite direction to the ratchet part.

* * * * *